US012574981B2

(12) United States Patent (10) Patent No.: US 12,574,981 B2
Dutta et al. (45) Date of Patent: Mar. 10, 2026

(54) ALTERNATE PATH DETECTION USING A REPEATER

(71) Applicant: QUALCOMM Incorporated, San Diego, CA (US)

(72) Inventors: Sourjya Dutta, San Diego, CA (US); Navid Abedini, Basking Ridge, NJ (US); Kapil Gulati, Belle Mead, NJ (US); Naeem Akl, Somerville, NJ (US)

( * ) Notice: Subject to any disclaimer, the term of this patent is extended or adjusted under 35 U.S.C. 154(b) by 576 days.

(21) Appl. No.: 17/657,016

(22) Filed: Mar. 29, 2022

(65) Prior Publication Data

US 2023/0319918 A1 Oct. 5, 2023

(51) Int. Cl.
| | |
|---|---|
| *H04W 76/15* | (2018.01) |
| *H04B 7/0408* | (2017.01) |
| *H04L 45/16* | (2022.01) |
| *H04L 45/24* | (2022.01) |
| *H04W 40/12* | (2009.01) |
| *H04W 40/20* | (2009.01) |
| *H04W 40/22* | (2009.01) |
| *H04W 72/044* | (2023.01) |
| *H04W 72/54* | (2023.01) |

(52) U.S. Cl.
CPC .......... *H04W 76/15* (2018.02); *H04B 7/0408* (2013.01); *H04L 45/16* (2013.01); *H04L 45/24* (2013.01); *H04W 40/12* (2013.01); *H04W 40/20* (2013.01); *H04W 40/22* (2013.01); *H04W 72/046* (2013.01); *H04W 72/54* (2023.01)

(58) Field of Classification Search
CPC ... H04B 7/0408; H04B 7/06952; H04L 45/16; H04L 45/24; H04W 40/12; H04W 40/20; H04W 40/22; H04W 72/046; H04W 72/54; H04W 76/15
See application file for complete search history.

(56) References Cited

U.S. PATENT DOCUMENTS

| | | | | |
|---|---|---|---|---|
| 2020/0145093 A1* | 5/2020 | Cheng | .................. | H04B 7/1555 |
| 2021/0315057 A1* | 10/2021 | Baek | ..................... | H04W 76/10 |
| 2021/0329656 A1* | 10/2021 | Landis | .................. | H04W 72/21 |
| 2024/0187085 A1* | 6/2024 | McMenamy | ...... | H04B 7/15507 |
| 2024/0340760 A1* | 10/2024 | Yao | ........................ | H04W 24/02 |

FOREIGN PATENT DOCUMENTS

| | | | |
|---|---|---|---|
| WO | WO-2022074118 A1 * | 4/2022 | |
| WO | WO-2023141904 A1 * | 8/2023 | |
| WO | WO-2023143153 A1 * | 8/2023 | |

* cited by examiner

*Primary Examiner* — Ayaz R Sheikh
*Assistant Examiner* — David Zhijun Sun

(57) ABSTRACT

Various aspects of the present disclosure generally relate to wireless communication. In some aspects, a repeater may transmit, to a user equipment (UE), an alternate access path indication associated with an access link connection path for connecting to a network node. The repeater may communicate with the UE on a side channel to establish a connection to the network node via the access link connection path. Numerous other aspects are described.

30 Claims, 10 Drawing Sheets

600

610 Receive, from a repeater, an alternate access path indication associated with an access link connection path for connecting to a network node 620 Communicate with the repeater on a side channel to establish a connection to the network node via the access link connection path Transmit, to a UE, an alternate access path indication associated with an access link connection path for connecting to a network node Communicate with the UE on a side channel to establish a connection to the network node via the access link connection path

710

720

700

ALTERNATE PATH DETECTION USING A REPEATER

FIELD OF THE DISCLOSURE

Aspects of the present disclosure generally relate to wireless communication and to techniques and apparatuses for alternate path detection using a repeater.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive, from a repeater, an alternate access path indication associated with an access link connection path for connecting to a network node. The one or more processors may be configured to communicate with the repeater on a side channel to establish a connection to the network node via the access link connection path.

Some aspects described herein relate to a repeater for wireless communication. The repeater may include a memory and one or more processors coupled to the memory. The one or more processors may be configured to transmit, to a UE, an alternate access path indication associated with an access link connection path for connecting to a network node. The one or more processors may be configured to communicate with the UE on a side channel to establish a connection to the network node via the access link connection path.

Some aspects described herein relate to a method of wireless communication performed by a UE. The method may include receiving, from a repeater, an alternate access path indication associated with an access link connection path for connecting to a network node. The method may include communicating with the repeater on a side channel to establish a connection to the network node via the access link connection path.

Some aspects described herein relate to a method of wireless communication performed by a repeater. The method may include transmitting, to a UE, an alternate access path indication associated with an access link connection path for connecting to a network node. The method may include communicating with the UE on a side channel to establish a connection to the network node via the access link connection path.

Some aspects described herein relate to a non-transitory computer-readable medium that stores a set of instructions for wireless communication by a UE. The set of instructions, when executed by one or more processors of the UE, may cause the UE to receive, from a repeater, an alternate access path indication associated with an access link connection path for connecting to a network node. The set of instructions, when executed by one or more processors of the UE, may cause the UE to communicate with the repeater on a side channel to establish a connection to the network node via the access link connection path.

Some aspects described herein relate to a non-transitory computer-readable medium that stores a set of instructions for wireless communication by a repeater. The set of instructions, when executed by one or more processors of the repeater, may cause the repeater to transmit, to a UE, an alternate access path indication associated with an access link connection path for connecting to a network node. The set of instructions, when executed by one or more processors of the repeater, may cause the repeater to communicate with the UE on a side channel to establish a connection to the network node via the access link connection path.

Some aspects described herein relate to an apparatus for wireless communication. The apparatus may include means for receiving, from a repeater, an alternate access path indication associated with an access link connection path for connecting to a network node. The apparatus may include means for communicating with the repeater on a side channel to establish a connection to the network node via the access link connection path.

Some aspects described herein relate to an apparatus for wireless communication. The apparatus may include means for transmitting, to a UE, an alternate access path indication associated with an access link connection path for connecting to a network node. The apparatus may include means for communicating with the UE on a side channel to establish a connection to the network node via the access link connection path.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
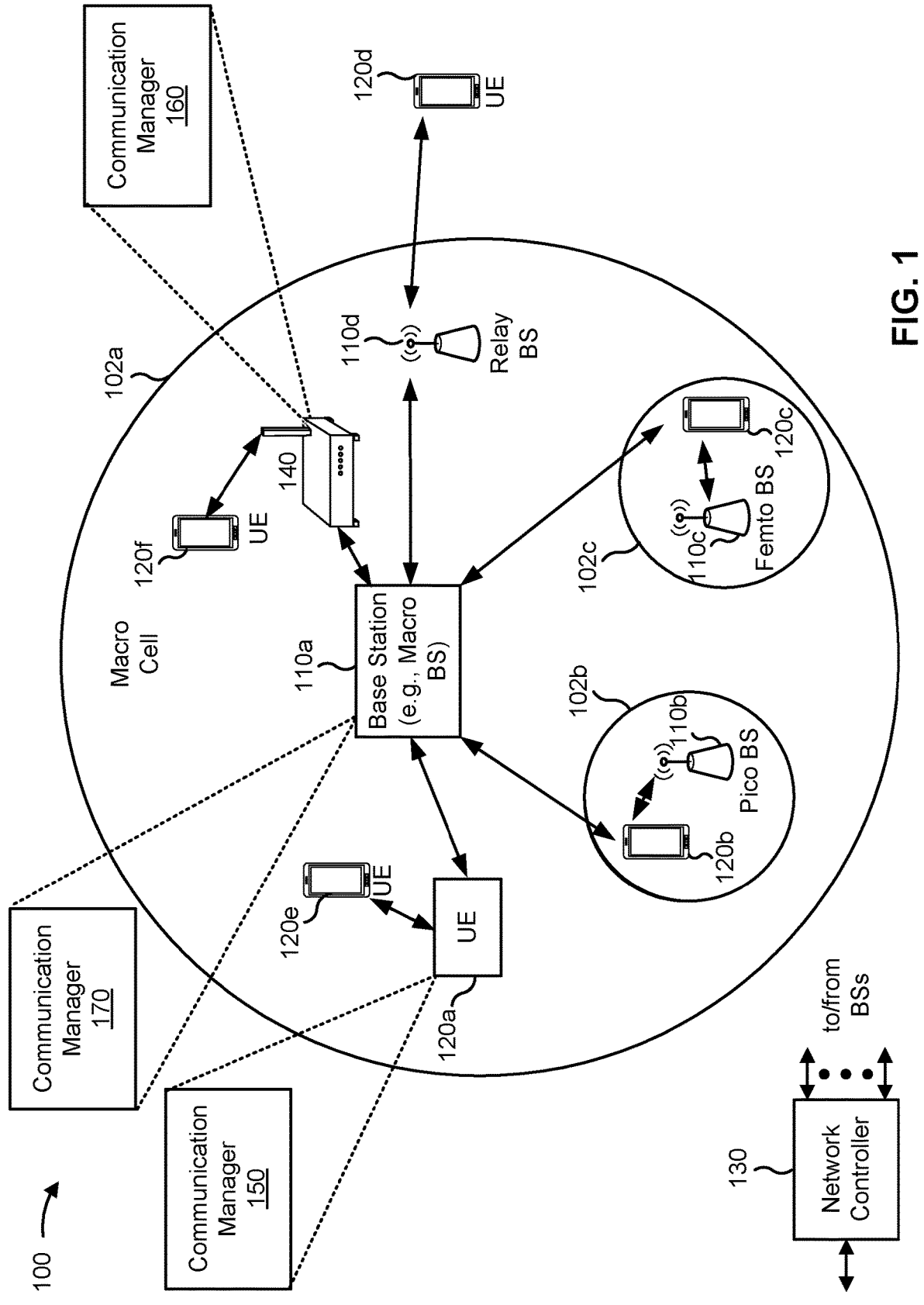
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a millimeter wave (mmW) repeater 140 may receive a millimeter wave signal (e.g., an analog millimeter wave signal) from a base station 110, may amplify the millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer 1 mmW repeater. Additionally, or alternatively, the mmW repeater 140 may be a wireless TRP acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some aspects, a UE (e.g., the UE 120) may include a communication manager 150. As described in more detail elsewhere herein, the communication manager 150 may receive, from a repeater, an alternate access path indication associated with an access link connection path for connecting to a network node; and communicate with the repeater on a side channel to establish a connection to the network node via the access link connection path. Additionally, or alternatively, the communication manager 150 may perform one or more other operations described herein.

In some aspects, a repeater (e.g., the repeater 140) may include a communication manager 160. As described in more detail elsewhere herein, the communication manager 160 may transmit, to a UE, an alternate access path indication associated with an access link connection path for connecting to a network node; and communicate with the UE on a side channel to establish a connection to the network node via the access link connection path. Additionally, or alternatively, the communication manager 160 may perform one or more other operations described herein.

As indicated above, FIG. 1 is provided as an example. Other examples may differ from what is described with regard to FIG. 1.

Figure 2:
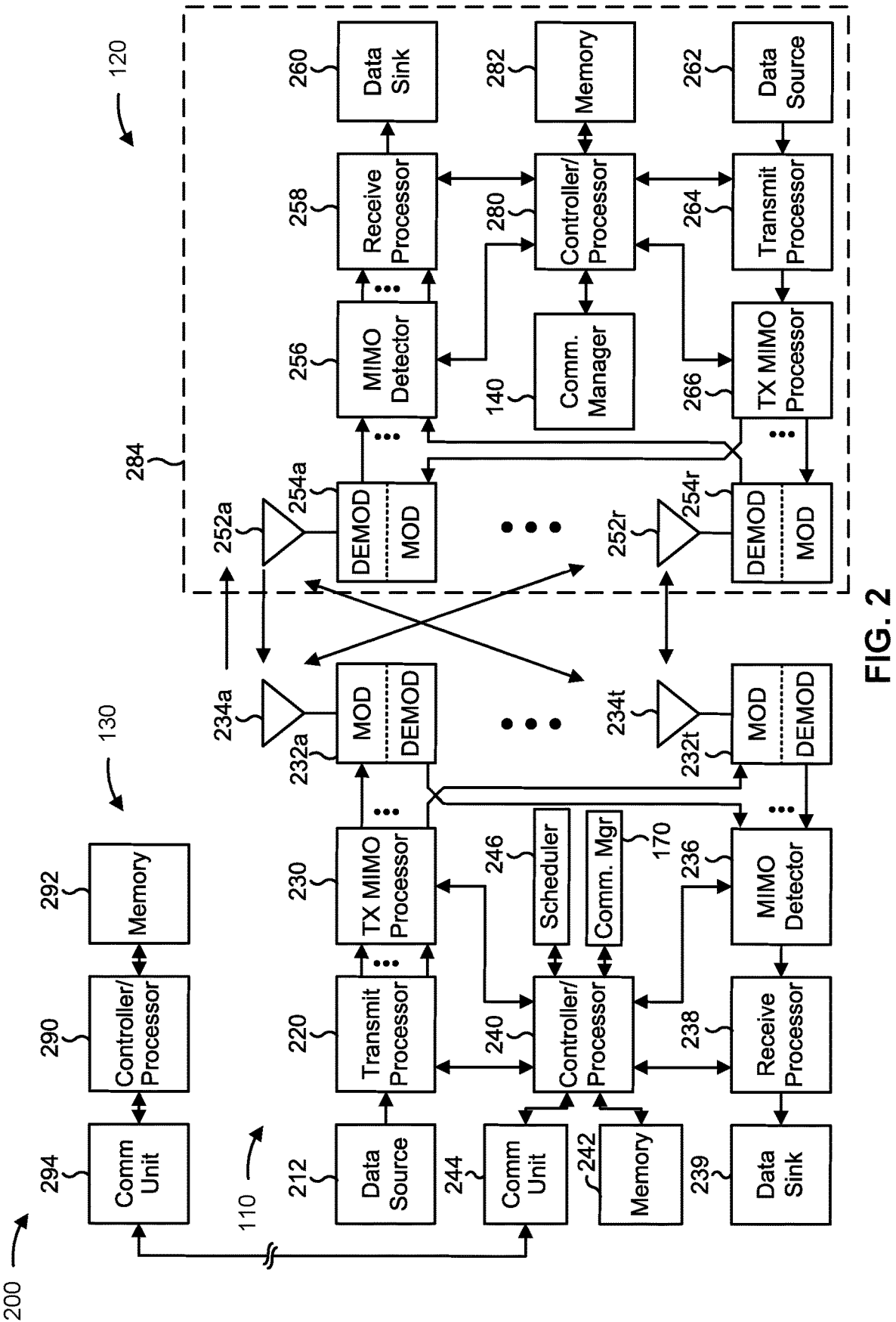
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI frame-work. In some cases, the network may support layer 1 (L1)-based beam indication using at least UE-specific (uni-cast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowl-edgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator compo-nent, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive proces-sor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more tech-niques associated with alternate path detection using a repeater, as described in more detail elsewhere herein. In some aspects, the repeater described herein is the UE 120, is included in the UE 120, or includes one or more components of the UE 120 shown in FIG. 2. In some aspects, the network node described herein is the base station 110, is included in the base station 110, or includes one or more components of the base station 110 shown in FIG. 2. For example, the controller/processor 240 of the base station 110, the con-troller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compil-ing, converting, and/or interpreting) by one or more proces-sors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, convert-ing the instructions, compiling the instructions, and/or inter-preting the instructions, among other examples.

While blocks in FIG. 2 are illustrated as distinct compo-nents, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, a UE (e.g., the UE 120) includes means for receiving, from a repeater, an alternate access path indication associated with an access link connection path for connecting to a network node; and/or means for communi-cating with the repeater on a side channel to establish a connection to the network node via the access link connec-tion path. The means for the UE to perform operations described herein may include, for example, one or more of communication manager 150, antenna 252, modem 254, MIMO detector 256, receive processor 258, transmit processor 264, TX MIMO processor 266, controller/processor 280, or memory 282.

In some aspects, a repeater (e.g., the repeater 140) includes means for transmitting, to a UE, an alternate access path indication associated with an access link connection path for connecting to a network node; and/or means for communicating with the UE on a side channel to establish a connection to the network node via the access link connection path. In some aspects, the means for the repeater to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246. In some aspects, the means for the repeater to perform operations described herein may include, for example, one or more of communication manager 150, antenna 252, modem 254, MIMO detector 256, receive processor 258, transmit processor 264, TX MIMO processor 266, controller/processor 280, or memory 282.

As indicated above, FIG. 2 is provided as an example. Other examples may differ from what is described with regard to FIG. 2.

Figure 3:
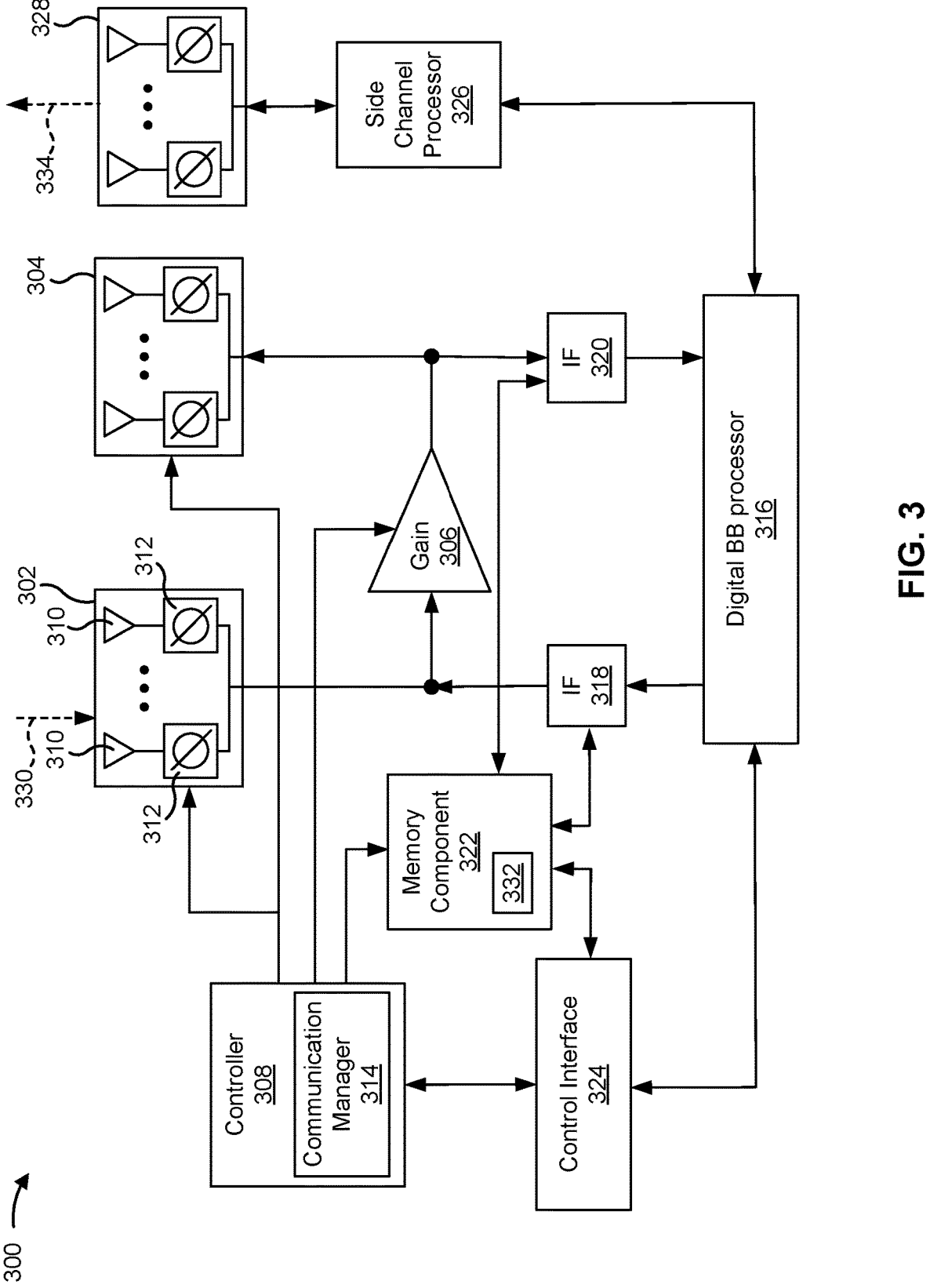
FIG. 3 is a diagram illustrating an example of an enhanced millimeter wave repeater, in accordance with the present disclosure.

FIG. 3 is a diagram illustrating an example of an enhanced millimeter wave repeater 300, in accordance with the present disclosure. An enhanced millimeter wave repeater is sometimes referred to as a "smart repeater," and is referred to herein as a "repeater." The repeater 300 may be, be similar to, include, or be included in the millimeter wave repeater 140 shown in FIG. 1.

As shown in FIG. 3, the repeater 300 includes a first phased antenna array 302 and a second phased antenna array 304, a gain component 306, and a controller 308. In some cases, the repeater 300 can include any number of additional antenna arrays. In some cases, the repeater 300 can include only one antenna array. The antenna array 302 includes multiple antenna elements 310 capable of being configured for beamforming. For example, the antenna array 302 can be referred to as a phased array because phase values and/or phase offsets of the antenna elements 310 can be configured to form a beam, with different phase values and/or phase offsets being used for different beams (e.g., in different directions). As shown, for example, each antenna element 310 can be coupled to a phase shifter 312 that can be used to apply the different phase values and/or phase offsets. The antenna array 302 can be a fixed receive (RX) antenna array capable of only receiving communications while not transmitting communications, and the antenna array 304 can be a fixed TX antenna array capable of only transmitting communications while not receiving communications. The antenna array 302 and/or 304 can be capable of being configured to act as an RX antenna array or a TX antenna array (e.g., via a TX/RX switch and/or a multiplexing (MUX)/demultiplexing (DEMUX) element). The antenna arrays 302 and 304 can be capable of communicating using millimeter waves.

The gain component 306 is a component capable of amplifying an input signal and outputting an amplified signal. For example, the gain component 306 can include a power amplifier and/or a variable gain component. The gain component 306 can have variable gain control. The gain component 306 can connect to an RX antenna array (e.g., the first antenna array 302) and a TX antenna array (e.g., the second antenna array 304) such that an analog millimeter wave signal, received via the RX antenna array 302, can be amplified by the gain component 306 and be output to the TX antenna array 304 for transmission. The level of amplification of the gain component 306 can be controlled by the controller 308.

The controller 308 is a component capable of controlling one or more other components of the repeater 300. For example, the controller 308 can include a controller, a microcontroller, and/or a processor. The controller 308 can control the gain component 306 by controlling a level of amplification or gain applied by the gain component 306 to an input signal. Additionally, or alternatively, the controller 308 can control the antenna array 302 and/or 304 by controlling a beamforming configuration for the antenna array 302 and/or 304 (e.g., one or more phase values for the antenna array 302 and/or 304, one or more phase offsets for the antenna array 302 and/or 304, one or more power parameters for the antenna array 302 and/or 304, one or more beamforming parameters for the antenna array 302 and/or 304, a TX beamforming configuration, and/or an RX beamforming configuration, among other examples), by controlling whether the antenna array 302 and/or 304 acts as an RX antenna array or a TX antenna array. Additionally, or alternatively, the controller 308 can power on or power off one or more components of the repeater 300 (e.g., when a network node does not need to use the repeater 300 to serve UEs). In some examples, the controller 308 can control a timing of one or more of the above configurations.

In some examples, the controller 308 can include a communication manager 314. The communication manager 314 can include a software and/or hardware component configured to facilitate the operations of the controller 308. In some examples, the controller 308 is the communication manager 314. In some examples, the communication manager 314 can include the controller 308. In some examples, the communication manager 314 can include the controller 308, the antenna arrays 302 and 304, and/or any number of other components of the repeater 300. The communication manager may be, be similar to, include, or be included in the communication manager 160 depicted in FIG. 1.

The repeater 300 can include components that allow the repeater 300 to perform at least limited baseband processing. Such components can include, for example, a digital baseband (BB) processor 316 (with at least limited baseband capability, for example, relative to a UE or a gNB). The repeater 300 also can include intermediate frequency (IF) stages (for example, a first IF stage 318 and a second IF stage 320) including mixers, filters, analog-to-digital converters (ADCs), and/or digital-to-analog converters (DACs), among other examples. The IF stages 318 and 320 can be designed to convert a received RF signal to an IF signal, obtain and store digital (IQ) samples, and generate the RF signal from stored digital samples. For this purpose, the repeater 300 can include a memory component 322 that has at least sufficient storage capacity to implement a buffer to store the IQ samples.

In some aspects of the present disclosure, the repeater 300 may be used to discover alternate access paths for connection between a UE and a network node. To facilitate the alternate path discovery, the repeater 300 may be able to communicate with a UE using a separate channel (a channel other than an access channel), which may be referred to, for example, as a "side channel." The side channel may be used for repeater 300 control by a UE.

In some aspects, for example, the repeater 300 may include a control interface 324 configured to receive control signaling from a UE and to facilitate transmission of control signaling to the UE, as described herein. As described above, the control interface 324 may facilitate communications via a side channel. In some aspects, the repeater 300 also may include a side channel processor 326 configured to process Tx and Rx control signals. In some aspects, the side channel processor 326 may be associated with a side channel antenna array 328 that is used for side channel communications. The side channel antenna array 328 may, in some aspects, be a phased array. In some aspects, the side channel processor 326 may be associated with the first antenna array 302 and/or the second antenna array 304 for side channel signaling.

The control interface 324 may be implemented out-of-band (e.g., operating outside a carrier frequency different than a frequency on which the repeater 300 communicates with a network node) or in-band (e.g., using a smaller bandwidth part of a same carrier frequency on which the repeater 300 communicates with a network node). For example, the control interface 324 may communicate with a UE using a personal area network (PAN) technology (e.g., Bluetooth or Bluetooth Low Energy (BLE)), a 4G or LTE radio access technology, a narrowband Internet of Things (NB-IoT) technology, a sub-6 GHz technology, a Wi-Fi technology, and/or a visible light communication technology, among other examples. In some aspects, the control interface 324 may use a lower frequency communication technology, and the antenna arrays 302 and/or 304 may use a higher frequency communication technology (e.g., millimeter wave).

In the case of the in-band control, the digital BB processor 316 may be used to extract the control signaling from a received RF signal. In some aspects, the digital BB processor 316 produces an output to an IF stage (for example, the first IF stage 318 or the second IF stage 320) that gets summed with an analog path for an onward link, which may not exist (or be enabled) for a link to a UE from the smart repeater. On the other hand, for the link from the repeater to the network node, this branch may be used to sum a signal coming from the UE (and going to the network node) with any locally generated signal that the smart repeater concurrently sends to the network node.

In some cases, a repeater (e.g., the repeater 300) is used to facilitate communication between a UE and a network node, but is not configured to search for access paths to a network node. Accordingly, the access path facilitated by the repeater can be less efficient and/or otherwise have a lower signal quality than other available paths. Some aspects of the techniques and entities described herein may provide a repeater that can perform access searches and, thus cell tracking, to determine alternate access paths for facilitating communication between the repeater and a UE. For example, the side channel processor 326 may be used to communicate with a UE on a side channel. The repeater 300 may be configured to decode a synchronization signal block (SSB) 330 received from a network node and may store an SSB index 332 in the memory component 322. The repeater 300 may transmit, to a UE via a side channel, an alternate access path indication 334 associated with an access link connection path for connecting to a network node. The repeater 300 may be configured to perform other operations as described herein in connection with alternate path detection.

In some aspects, the antenna array 302, 304, and/or 328, gain component 306, controller 308, communication manager 314, digital BB processor, first IF stage 318, second IF stage 320, memory component 322, control interface 324, and/or side channel processor 326 may perform one or more techniques associated with communicating with and/or controlling a millimeter wave repeater, as described in more detail elsewhere herein. For example, one or more components of the repeater 300 may perform or direct operations of, for example, process 700 of FIG. 7 and/or other processes as described herein. In some aspects, the repeater 300 includes a transceiver. The transceiver may include any combination of the antenna arrays 302, 304, and 328, the gain component 306, the controller 308, the communication manager 314, the digital BB processor 316, the IF stage 318 and/or 320, the memory component 322, the control interface 324, and/or the side channel processor 326. The transceiver may be used by a processor (e.g., the controller 308) and the memory component 322 to perform aspects of any of the operations described herein, for example, as described with reference to FIG. 5. In some aspects, the memory component 322 may comprise a non-transitory computer-readable medium storing one or more instructions for wireless communication. For example, the one or more instructions, when executed (e.g., directly, or after compiling, converting, and/or interpreting) by one or more processors (e.g., the controller 308, the control interface 324, the digital BB processor 316, and/or the side channel processor 326) of the repeater 300, may perform or direct operations of, for example, process 700 of FIG. 7 and/or other processes as described herein. In some aspects, executing instructions may include running the instructions, converting the instructions, compiling the instructions, and/or interpreting the instructions.

In some aspects, the repeater 300 may include means for transmitting, to a UE, an alternate access path indication associated with an access link connection path for connecting to a network node, and means for communicating with the UE on a side channel to establish a connection to the network node via the access link connection path, or the like. In some aspects, such means may include one or more components of the repeater 300 described in connection with FIG. 3, such as, for example, one or more of the antenna arrays 302, 304 and 328, the gain component 306, the controller 308, the communication manager 314, the digital BB processor 316, one or more of the IF stages 318 and 320, the memory component 322, the control interface 324, and/or the side channel processor 326, among other examples.

As indicated above, FIG. 3 is provided as an example. Other examples may differ from what is described with respect to FIG. 3.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a network node that communicates using the sub-6 GHz radio waves. However, a millimeter wave may not be capable of penetrating the same wall (e.g., depending on a thickness of the wall and/or a material from which the wall is constructed).

Figure 4:
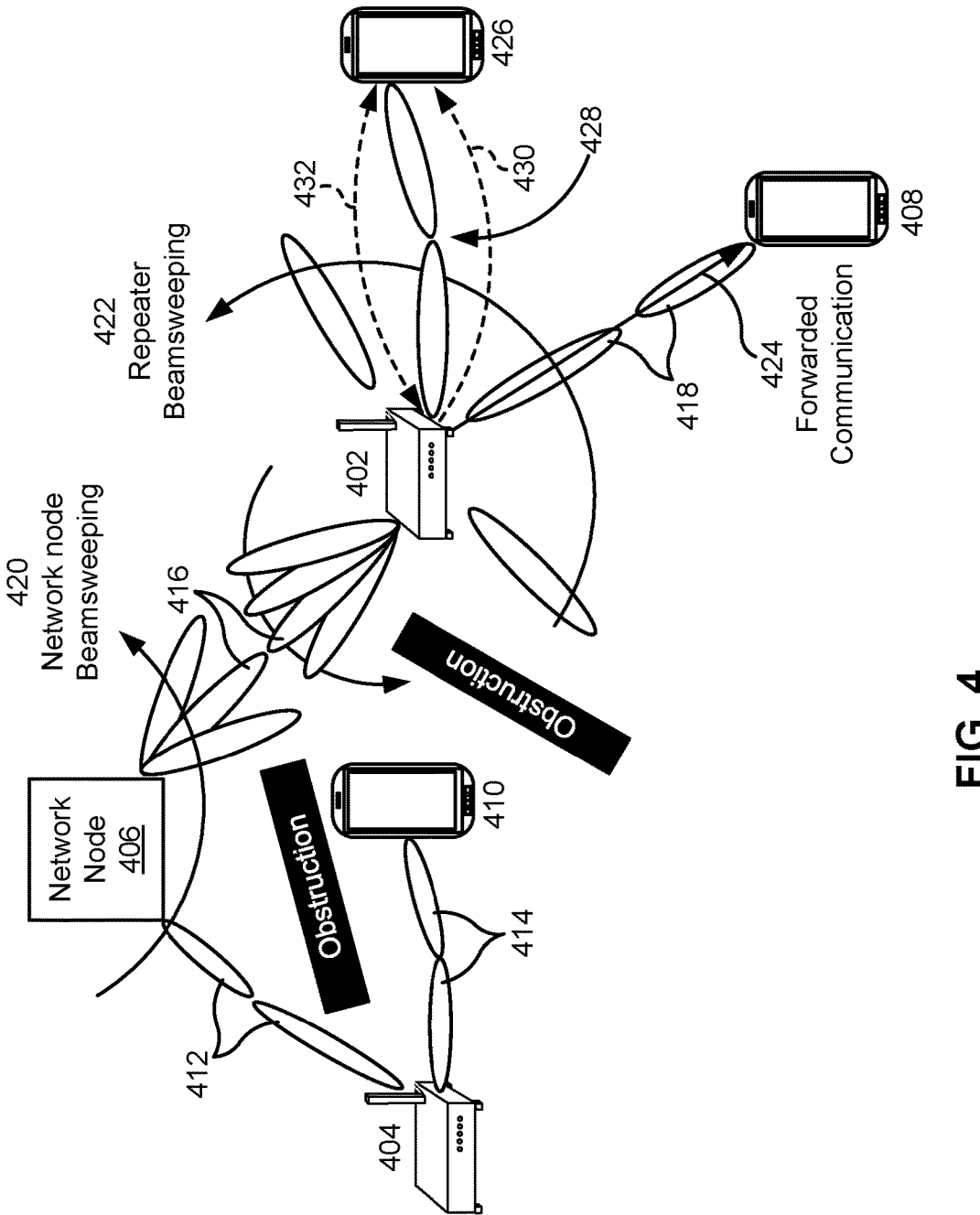
FIG. 4 is a diagram illustrating an example of communicating using a repeater, in accordance with the present disclosure.

FIG. 4 is a diagram illustrating an example 400 of communicating using a repeater, in accordance with the present disclosure. A repeater 402 and/or 404 may be used to increase the coverage area of a network node 406 and/or to extend coverage to UEs 408 and/or 410 without line of sight to the network node 406 (e.g., due to an obstruction).

In some cases, the repeater 402 and/or 404 can be, be similar to, include, or be included in the repeater 300 depicted in FIG. 3.

For example, as illustrated in the example 400 of FIG. 4, an obstruction between the UE 410 and the network node 406 blocks or otherwise reduces the quality of a link between the network node 406 and UE 410. Similarly, an obstruction between the UE 410 and the repeater 402 blocks or otherwise reduces the quality of a link between the repeater 402 and the UE 410. However, no obstructions or fewer obstructions exist between the repeater 404 and the UE 410, and, as such, it is possible that communications between the repeater 404 and the UE 410 will have a higher quality than communications between the network node 406 and the UE 410 or between the repeater 402 and the UE 410. Furthermore, the repeater 402 and/or 404 described herein may be a layer 1 or an analog millimeter wave repeater, which is associated with a lower cost, less processing, and lower latency than a layer 2 or layer 3 repeater.

A repeater 402 can perform directional communication by using beamforming to communicate with the network node 406 via a first beam pair 412 and to communicate with a UE 410 via a second beam pair 414. Similarly, the repeater 402 can communicate with the network node 406 via a first beam pair 416 and can communicate with the UE 408 via a second beam pair 418. A beam pair refers to a Tx beam used by a first entity (e.g., a UE, a network node, and/or a repeater, among other examples) for transmission and an Rx beam used by a second entity (e.g., a UE, a network node, and/or a repeater, among other examples) for reception of information transmitted by the first entity via the Tx beam.

As shown by reference number 420, the network node 406 can use a beamsweeping procedure to transmit communications via multiple beams over time (e.g., using time division multiplexing (TDM)). As shown, the repeater 402 can receive a communication from the UE 408 via the beam pair 418. As shown by reference number 422, the repeater 402 can perform repeater beamsweeping to forward each received communication via multiple Tx beams of the repeater 402 (e.g., using TDM). As used herein, forwarding a communication can refer to transmitting the received communication (e.g., after amplifying the received communication) without decoding the received communication and/or without modifying information carried in the received communication. Alternatively, forwarding a received communication can refer to transmitting the received communication after decoding the received communication and/or modifying information carried in the received communication. A received communication may be forwarded using a different time resource, a different frequency resource, and/or a different spatial resource (e.g., a different beam) to transmit the communication as compared to a time resource, a frequency resource, and/or a spatial resource in which the communication was received. As shown, the UE 408 can receive a forwarded communication 424.

In some cases, as explained above in connection with FIG. 3, a repeater is used to facilitate communication between a UE and a network node, but is not configured to search for access paths to a network node. Accordingly, the access path facilitated by the repeater can be less efficient and/or otherwise have a lower signal quality than other available paths.

Some aspects of the techniques and entities described herein may provide a repeater that can perform access searches and, thus cell tracking, to determine alternate access paths for facilitating communication between the repeater and a UE. As shown in FIG. 4, for example, a UE 426 may initiate creation of a beam pair link (BPL) 428 with the repeater 402 through beam training (e.g., using beam training resources granted by the network node 406). In some aspects, the repeater 402 may track cells autonomously and/or based at least in part on receiving a cell tracking indication from the UE 426. As shown by reference number 430, the repeater 402 may transmit, to the UE 426 via a side channel (e.g., using the BPL 428), an alternate access path indication associated with an access link connection path for connecting to a network node. As shown by reference number 432, the repeater 402 may communicate with the UE 426 on a side channel to establish a connection to the network node 406 via the access link connection path. In this way, some aspects of the present disclosure provide smart repeaters that can perform alternate path detection to facilitate enhanced performance of communications between a UE and a network node.

As indicated above, FIG. 4 is provided as an example. Other examples may differ from what is described with regard to FIG. 4.

Figure 5:
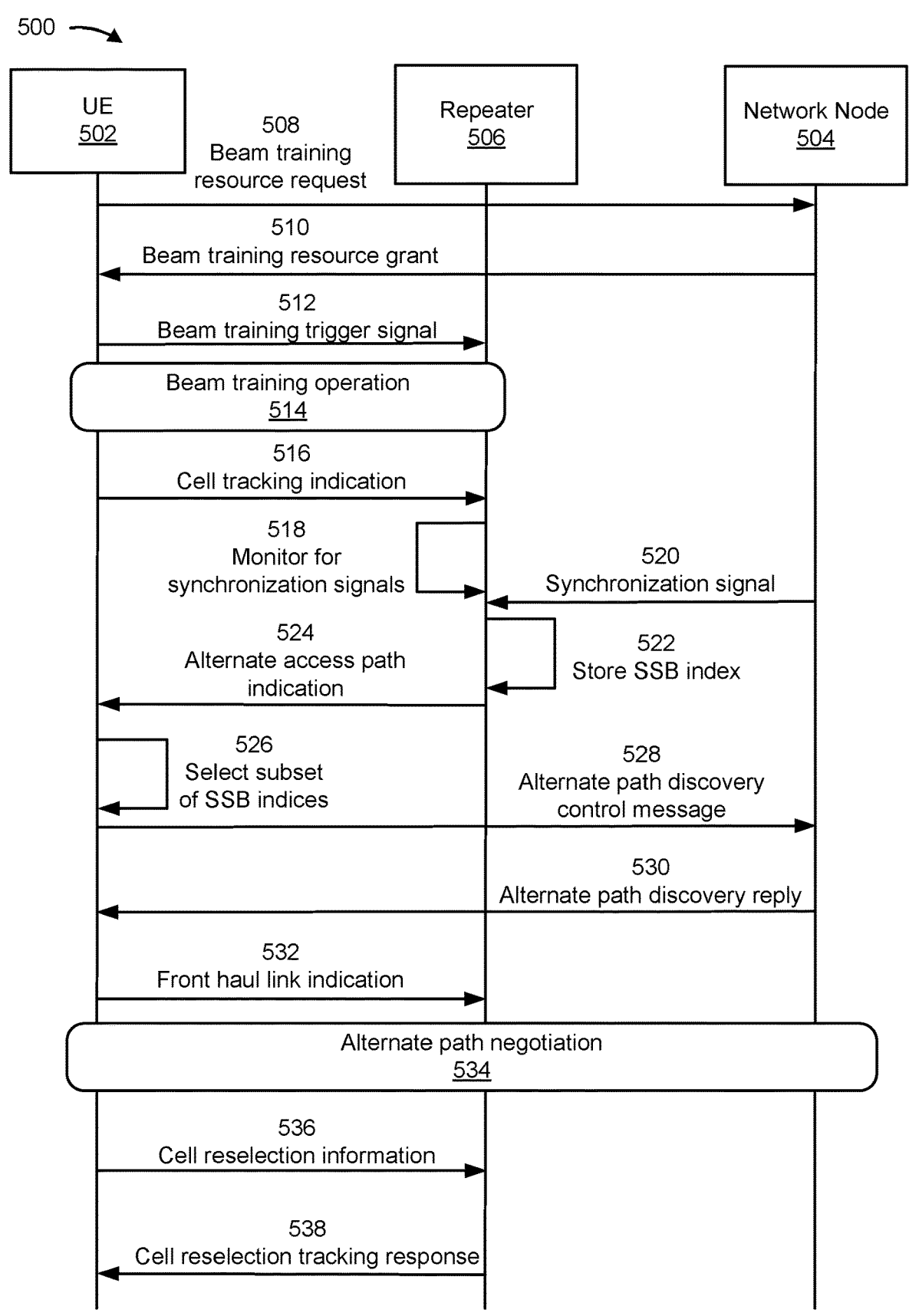
FIG. 5 is a diagram illustrating an example associated with alternate path detection using a repeater, in accordance with the present disclosure.

FIG. 5 is a diagram illustrating an example 500 associated with alternate path detection using a repeater, in accordance with the present disclosure. As shown in FIG. 5, a UE 502, a network node 504, and a repeater 506 may communicate with one another. In some aspects, the UE 502 may be, be similar to, include, or be included in the UE 426 depicted in FIG. 4 and/or the UE 120 depicted in FIGS. 1 and 2. The network node 504 may be, be similar to, include, or be included in the network node 406 depicted in FIG. 4. The repeater 506 may be, be similar to, include, or be included in the repeater 402 depicted in FIG. 4, the repeater 300 depicted in FIG. 3, and/or the repeater 140 depicted in FIG. 1.

As shown by reference number 508, the UE 502 may transmit, to the network node 504, a beam training resource request for resources associated with a beam training operation associated with creating a BPL with the repeater 506. In some aspects, the UE 502 may transmit a radio resource control (RRC) message that indicates the beam training resource request. In some aspects, the UE 502 transmit a medium access control control (MAC CE) element that indicates the beam training resource request.

As shown by reference number 510, the UE 502 may receive, from the network node 504, a beam training resource grant that indicates a set of beam training resources for the beam training operation. In some aspects, the UE 502 may receive a DCI transmission that indicates the beam training resource grant. In some aspects, the beam training resource grant may indicate a time domain resource for beam training, a frequency domain resource for beam training, a periodicity associated with a repetition of the set of beam training resources, a maximum number of measurement periods associated with the repetition of the set of beam training resources, a set of reference signals to be used for the beam training operation, a feedback resource (e.g., corresponding to a beam training occasion) for receiving feedback from the repeater, and/or a maximum power for transmission of a reference signal of the set of reference signals, among other examples.

As shown by reference number 512, the UE 502 may transmit, and the repeater 506 may receive, a beam training trigger signal associated with a beam training operation. The beam training trigger signal may include a start time indication associated with the beam training operation and/or a stop time indication associated with the beam training operation. The beam training trigger signal may include a feedback configuration indication corresponding to a configuration for providing beam training feedback to the UE 502. The beam training trigger signal may include an indication of a number of UE 502 beams that the UE 502 will sweep corresponding to each repeater beam.

As shown by reference number 514, the UE 502 and the repeater 506 may perform the beam training operation to create a BPL. In some aspects, performing the beam training operation may include communicating on a side channel. In some aspects, the repeater 506 may create the BPL with the UE 502 based at least in part on receiving the beam training trigger signal. To perform the beam training operation, the UE 502 may transmit (e.g., via an access link band) at least one UE 502 reference signal to the repeater 506. The repeater 506 may transmit, and the UE 502 may receive, beam training feedback based at least in part on the at least one UE 502 reference signal. The UE 502 may receive beam training feedback associated with a UE 502 beam having a RSRP value. In some aspects, the UE 502 may receive the beam training feedback based at least in part on the highest RSRP value satisfying a training threshold. In some aspects, the UE 502 may transmit a plurality of reference signals and, for each reference signal, receive beam training feedback until a BPL is established. A BPL may be established based on the BPL (e.g., the corresponding beam pair) satisfying a minimum quality metric. The minimum quality metric may include, for example, an RSRP threshold. In some aspects, the UE 502 may transmit reference signals until a specified maximum number of reference signals is transmitted.

As shown by reference number 516, the UE 502 may transmit, and the repeater 506 may receive, a cell tracking indication. In some aspects, the cell tracking indication may be transmitted on a side channel. In some aspects, the cell tracking indication may include only one bit. In some aspects, the cell tracking indication may indicate at least one cell ID, a band to be monitored, a bandwidth part to be monitored, a synchronization raster, a channel raster, an SSB based measurement timing configuration (SMTC), and/or an indication of an RSRP threshold, among other examples. In some aspects, the SMTC may indicate a timing duration, an offset associated with measurements on one or more SSB rasters, and/or a periodicity associated with the measurements on the one or more SSB rasters.

As shown by reference number 518, the repeater 506 may monitor for synchronization signals (e.g., SSBs). In some aspects, the repeater 506 may monitor for synchronization signals based at least in part on receiving the cell tracking indication. In some aspects, the repeater 300 may monitor for synchronization signals according to a periodical monitoring configuration. In some aspects, the repeater 506 may monitor for synchronization signals continually (e.g., continuously or approximately continuously in the case in which the repeater 506 interrupts the monitoring to use the antennas that are used for monitoring for some other task).

As shown by reference number 520, the network node 504 may transmit, and the repeater 506 may receive, a synchronization signal. As shown by reference number 522 the repeater 506 may store an SSB index associated with the synchronization signal. For example, in some aspects, the repeater 506 may store the SSB index based at least in part on an RSRP value associated with the synchronization signal satisfying an RSRP threshold. In some aspects, the repeater may store, in association with the SSB index, the RSRP value, a sub-carrier spacing corresponding to the synchronization signal, a system frame number corresponding to the synchronization signal, an SSB subcarrier offset associated with the network node, cell barred information associated with the network node, and/or an indication for allowing intra-frequency reselection associated with the network node, among other examples. In some aspects, the repeater 506 may store a mapping between the SSB index and a beam index corresponding to a repeater beam on which the synchronization signal was received.

As shown by reference number 524, the repeater 506 may transmit, and the UE 502 may receive, an alternate access path indication associated with an access link connection path for connecting to the network node. In some aspects, the repeater 506 may transmit a broadcast indicating cell information on the side channel. The cell information may include an SSB index and/or a cell ID associated with a synchronization signal detected by the repeater 506. In some aspects, the cell information may include at least one RSRP indication associated with the at least one of the SSB index or the cell ID. In some aspects, the RSRP indication is not an RSRP value. Rather, in some aspects, the RSRP indication may indicate an RSRP classification corresponding to a specified range of RSRP values. In some aspects, the at least one of the SSB index or the cell ID may include a set of SSB indices.

As shown by reference number 526, the UE 502 may select a subset of indices of the set of indices. For example, in some aspects, the cell information may include at least one RSRP indication associated with the at least one of the SSB index or the cell ID, and the UE 502 may select the subset of indices based at least in part on the at least one RSRP indication. In some aspects, the UE 502 may select the subset of indices based at least in part on at least one of a link quality of a direct link between the UE 502 and the network node 504 or a link quality of a BPL between the UE 502 and the repeater 506.

As shown by reference number 528, the UE 502 may transmit, and the network node 504 may receive, an alternate path discovery control message. The alternate path discovery control message may indicate an alternate path discovery request and an indication of the subset of SSB indices. As shown by reference number 530, the network node 504 may transmit, and the UE 502 may receive, an alternate path discovery reply. The alternate path discovery reply may, if the network node 504 accepts the request for an alternate path, include a resource grant for UE 502 reference signals to be used for alternate path measurements and/or an indication of a downlink measurement reporting occasion.

As shown by reference number 532, the UE 502 may transmit, and the repeater 506 may receive, a front haul link indication. In some aspects, the front haul link indication may indicate that the repeater is to use a front haul link associated with an indicated SSB index. In some aspects, the front haul link may correspond to a specified time. In some aspects, the front haul link indication may indicate at least one additional SSB index to be scanned. In some aspects, the front haul link indication may indicate a gain setting associated with an indicated SSB index and based at least in part on the RSRP indication. As shown by reference number 534, the UE 502 and the network node 504 may negotiate using an alternate path detection procedure in which the repeater 506 forwards reference signals to the network node 504 over pre-determined beam directions.

As shown by reference number 536, the UE 502 may transmit, and the repeater 506 may receive, cell reselection information. The cell reselection information may be transmitted on the side channel. In some aspects, the cell reselection information may include a physical cell identifier associated with a cell to be tracked, time domain information associated with tracking the cell, frequency domain information associated with tracking the cell, an SSB based measurement timing configuration, and/or processing information associated with tracking the cell, among other examples. In some aspects, for example, the processing information may include an RSRP criterion, an SSB averaging indication, and/or a cell reselection priority indication, among other examples.

As shown by reference number 538, the repeater 506 may transmit, and the UE 502 may receive, based at least in part on receiving the cell reselection information, a cell reselection tracking response. In some aspects, the cell reselection information may include an indication that the repeater can perform cell tracking associated with a set of indicated cells, an indication that the repeater can perform cell tracking associated with a subset of the set of indicated cells, and/or a tracking feature that is not available at the repeater 506. For example, the tracking feature may include an SSB averaging feature, a cell ranking feature, and/or beam ranking feature.

As indicated above, FIG. 5 is provided as an example. Other examples may differ from what is described with regard to FIG. 5.

Figure 6:
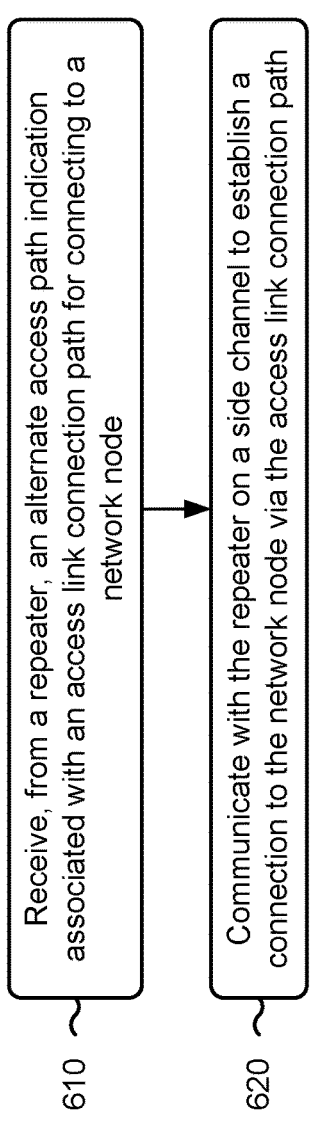
FIGS. 6 and 7 are diagrams illustrating example processes associated with alternate path detection using a repeater, in accordance with the present disclosure.

FIG. 6 is a diagram illustrating an example process 600 performed, for example, by a UE, in accordance with the present disclosure. Example process 600 is an example where the UE (e.g., UE 502) performs operations associated with alternate path detection using a repeater.

As shown in FIG. 6, in some aspects, process 600 may include receiving, from a repeater, an alternate access path indication associated with an access link connection path for connecting to a network node (block 610). For example, the UE (e.g., using communication manager 808 and/or reception component 802, depicted in FIG. 8) may receive, from a repeater, an alternate access path indication associated with an access link connection path for connecting to a network node, as described above.

As further shown in FIG. 6, in some aspects, process 600 may include communicating with the repeater on a side channel to establish a connection to the network node via the access link connection path (block 620). For example, the UE (e.g., using communication manager 808, reception component 802, and/or transmission component 804, depicted in FIG. 8) may communicate with the repeater on a side channel to establish a connection to the network node via the access link connection path, as described above.

Process 600 may include additional aspects, such as any single aspect or any combination of aspects described below and/or in connection with one or more other processes described elsewhere herein.

In a first aspect, process 600 includes transmitting a cell tracking indication to the repeater. In a second aspect, alone or in combination with the first aspect, transmitting the cell tracking indication comprises transmitting the cell tracking indication on the side channel. In a third aspect, alone or in combination with one or more of the first and second aspects, the cell tracking indication comprises only one bit. In a fourth aspect, alone or in combination with one or more of the first through third aspects, the cell tracking indication indicates at least one of at least one cell ID, a band to be monitored, a bandwidth part to be monitored, a synchronization raster, a channel raster, an SMTC, or an indication of an RSRP threshold. In a fifth aspect, alone or in combination with one or more of the first through fourth aspects, the SMTC indicates at least one of a timing duration, an offset associated with measurements on one or more SSB rasters, or a periodicity associated with the measurements on the one or more SSB rasters.

In a sixth aspect, alone or in combination with one or more of the first through fifth aspects, communicating with the repeater on the side channel comprises creating a BPL with the repeater. In a seventh aspect, alone or in combination with the sixth aspect, process 600 includes transmitting, to the network node, a beam training resource request for resources associated with a beam training operation associated with creating the BPL. In an eighth aspect, alone or in combination with the seventh aspect, transmitting the beam training resource request comprises transmitting an RRC message that indicates the beam training resource request. In a ninth aspect, alone or in combination with one or more of the seventh or eighth aspects, transmitting the beam training resource request comprises transmitting a MAC CE element that indicates the beam training resource request.

In a tenth aspect, alone or in combination with one or more of the seventh through ninth aspects, process 600 includes receiving a beam training resource grant that indicates a set of beam training resources for the beam training operation. In an eleventh aspect, alone or in combination with the tenth aspect, receiving the beam training resource grant comprises receiving a DCI transmission that indicates the beam training resource grant. In a twelfth aspect, alone or in combination with one or more of the tenth or eleventh aspects, the beam training resource grant indicates at least one of a time domain resource for beam training, a frequency domain resource for beam training, a periodicity associated with a repetition of the set of beam training resources, a maximum number of measurement periods associated with the repetition of the set of beam training resources, a set of reference signals to be used for the beam training operation, a feedback resource for receiving feedback from the repeater, or a maximum power for transmission of a reference signal of the set of reference signals. In a thirteenth aspect, alone or in combination with the twelfth aspect, the feedback resource corresponds to a beam training occasion.

In a fourteenth aspect, alone or in combination with one or more of the sixth through thirteenth aspects, process 600 includes transmitting, to the repeater, a beam training trigger signal associated with a beam training operation, wherein creating the BPL comprises performing the beam training operation based at least in part on receiving the beam training trigger signal. In a fifteenth aspect, alone or in combination with the fourteenth aspect, the beam training trigger signal comprises at least one of a start time indication associated with the beam training operation or a stop time indication associated with the beam training operation. In a sixteenth aspect, alone or in combination with one or more of the fourteenth or fifteenth aspects, the beam training trigger signal comprises a feedback configuration indication corresponding to a configuration for providing beam training feedback to the UE. In a seventeenth aspect, alone or in combination with one or more of the fourteenth through sixteenth aspects, the beam training trigger signal comprises an indication of a number of UE beams that the UE will sweep corresponding to each repeater beam.

In an eighteenth aspect, alone or in combination with one or more of the fourteenth through seventeenth aspects, performing the beam training operation comprises transmitting, via an access link band, at least one UE reference signal, and receiving beam training feedback from the repeater based at least in part on the at least one UE reference signal. In a nineteenth aspect, alone or in combination with the eighteenth aspect, receiving the beam training feedback comprises receiving beam training feedback associated with a UE beam having a highest RSRP value. In a twentieth aspect, alone or in combination with one or more of the nineteenth aspect, receiving the beam training feedback comprises receiving the beam training feedback based at least in part on the highest RSRP value satisfying a training threshold.

In a twenty-first aspect, alone or in combination with one or more of the eighteenth through twentieth aspects, transmitting the at least one UE reference signal comprises transmitting a plurality of reference signals, and receiving the beam training feedback comprises receiving the beam training feedback until a BPL beam is established that satisfies a minimum quality metric. In a twenty-second aspect, alone or in combination with one or more of the first through twenty-first aspects, receiving the alternate access path indication comprises receiving a broadcast indicating cell information on the side channel. In a twenty-third aspect, alone or in combination with the twenty-second aspect, the cell information comprises at least one of an SSB index or a cell ID associated with a synchronization signal detected by the repeater.

In a twenty-fourth aspect, alone or in combination with the twenty-third aspect, the cell information comprises at least one RSRP indication associated with the at least one of the SSB index or the cell ID. In a twenty-fifth aspect, alone or in combination with the twenty-fourth aspect, the RSRP indication is not an RSRP value. In a twenty-sixth aspect, alone or in combination with one or more of the twenty-fourth through twenty-fifth aspects, the RSRP indication indicates an RSRP classification corresponding to a specified range of RSRP values.

In a twenty-seventh aspect, alone or in combination with one or more of the twenty-third through twenty-sixth aspects, the at least one of the SSB index or the cell ID comprises a set of SSB indices, process 600 includes selecting a subset of indices of the set of indices. In a twenty-eighth aspect, alone or in combination with the twenty-seventh aspect, the cell information comprises at least one RSRP indication associated with the at least one of the SSB index or the cell ID, and selecting the subset of indices comprises selecting the subset of indices based at least in part on the at least one RSRP indication.

In a twenty-ninth aspect, alone or in combination with one or more of the twenty-seventh or twenty-eighth aspects, selecting the subset of indices comprises selecting the subset of indices based at least in part on at least one of a link quality of a direct link between the UE and the network node or a link quality of a beam pair link between the UE and the repeater. In a thirtieth aspect, alone or in combination with one or more of the twenty-seventh through twenty-ninth aspects, process 600 includes transmitting, to the network node, an alternate path discovery control message comprising an indication of an alternate path discovery request and an indication of the subset of SSB indices. In a thirty-first aspect, alone or in combination with the thirtieth aspect, process 600 includes receiving, from the network node, an alternate path discovery reply comprising at least one of a resource grant for UE reference signals to be used for alternate path measurements, or an indication of a downlink measurement reporting occasion.

In a thirty-second aspect, alone or in combination with one or more of the first through thirty-first aspects, process 600 includes transmitting a front haul link indication to the repeater, wherein the front haul link indication indicates that the repeater is to use a front haul link associated with an indicated SSB index. In a thirty-third aspect, alone or in combination with one or more of the first through thirty-second aspects, the front haul link corresponds to a specified time. In a thirty-fourth aspect, alone or in combination with the thirty-third aspect, the front haul link indication indicates at least one additional SSB index to be scanned. In a thirty-fifth aspect, alone or in combination with one or more of the thirty-third or thirty-fourth aspects, process 600 includes receiving an RSRP indication associated with the indicated SSB index, wherein the front haul link indication indicates a gain setting associated with the indicated SSB index and based at least in part on the RSRP indication.

In a thirty-sixth aspect, alone or in combination with one or more of the first through thirty-fifth aspects, process 600 includes transmitting cell reselection information to the repeater. In a thirty-seventh aspect, alone or in combination with the thirty-sixth aspect, transmitting the cell reselection information comprises transmitting the cell reselection information on the side channel. In a thirty-eighth aspect, alone or in combination with one or more of the thirty-sixth or thirty-seventh aspects, the cell reselection information includes at least one of a physical cell identifier associated with a cell to be tracked, time domain information associated with tracking the cell, domain information associated with tracking the cell, an SSB based measurement timing configuration, or processing information associated with tracking the cell. In a thirty-ninth aspect, alone or in combination with the thirty-eighth aspect, the processing information includes at least one of an RSRP criterion, an SSB averaging indication, or a cell reselection priority indication.

In a fortieth aspect, alone or in combination with one or more of the thirty-sixth through thirty-ninth aspects, process 600 includes receiving, based at least in part on receiving the cell reselection information, a cell reselection tracking response that indicates at least one of an indication that the repeater can perform cell tracking associated with a set of indicated cells, an indication that the repeater can perform cell tracking associated with a subset of the set of indicated cells, or a tracking feature that is not available at the repeater. In a forty-first aspect, alone or in combination with the fortieth aspect, the tracking feature comprises at least one of a synchronization signal block averaging feature, a cell ranking feature, or a beam ranking feature.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
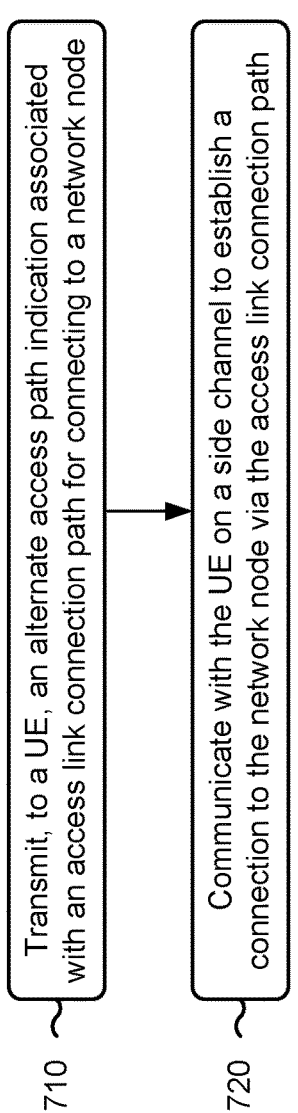

FIG. 7 is a diagram illustrating an example process 700 performed, for example, by a repeater, in accordance with the present disclosure. Example process 700 is an example where the repeater (e.g., repeater 506) performs operations associated with alternate path detection using a repeater.

As shown in FIG. 7, in some aspects, process 700 may include transmitting, to a UE, an alternate access path indication associated with an access link connection path for connecting to a network node (block 710). For example, the repeater (e.g., using communication manager 908 and/or transmission component 904, depicted in FIG. 9) may transmit, to a UE, an alternate access path indication associated with an access link connection path for connecting to a network node, as described above.

As further shown in FIG. 7, in some aspects, process 700 may include communicating with the UE on a side channel to establish a connection to the network node via the access link connection path (block 720). For example, the repeater (e.g., using communication manager 908, reception component 902, and/or transmission component 904, depicted in FIG. 9) may communicate with the UE on a side channel to establish a connection to the network node via the access link connection path, as described above.

Process 700 may include additional aspects, such as any single aspect or any combination of aspects described below and/or in connection with one or more other processes described elsewhere herein.

In a first aspect, the repeater is configured to autonomously track cell transmissions. In a second aspect, alone or in combination with the first aspect, process 700 includes monitoring for synchronization signals, and receiving a synchronization signal from the network node. In a third aspect, alone or in combination with the second aspect, process 700 includes storing an SSB index associated with the synchronization signal. In a fourth aspect, alone or in combination with the third aspect, storing the SSB index comprises storing the SSB index based at least in part on an RSRP value associated with the synchronization signal satisfying an RSRP threshold. In a fifth aspect, alone or in combination with one or more of the first through fourth aspects, process 700 includes storing, in association with the SSB index, at least one of the RSRP value, a sub-carrier spacing corresponding to the synchronization signal, a system frame number corresponding to the synchronization signal, an SSB subcarrier offset associated with the network node, cell barred information associated with the network node, or an indication for allowing intra-frequency re-selection associated with the network node.

In a sixth aspect, alone or in combination with one or more of the third through fifth aspects, process 700 includes storing a mapping between the SSB index and a beam index corresponding to a repeater beam on which the synchronization signal was received. In a seventh aspect, alone or in combination with one or more of the second through sixth aspects, monitoring for synchronization signals comprises monitoring according to a periodical monitoring configuration. In an eighth aspect, alone or in combination with one or more of the second through seventh aspects, monitoring for synchronization signals comprises monitoring continually.

In a ninth aspect, alone or in combination with one or more of the second through eighth aspects, process 700 includes receiving a cell tracking indication from the UE, wherein monitoring for synchronization signals comprises monitoring for synchronization signals based at least in part on receiving the cell tracking indication. In a tenth aspect, alone or in combination with the ninth aspect, receiving the cell tracking indication comprises receiving the cell tracking indication on the side channel. In an eleventh aspect, alone or in combination with one or more of the ninth or tenth aspects, the cell tracking indication comprises only one bit. In a twelfth aspect, alone or in combination with one or more of the ninth through eleventh aspects, the cell tracking indication indicates at least one of at least one cell ID, a band to be monitored, a bandwidth part to be monitored, a synchronization raster, a channel raster, an SMTC, or an indication of an RSRP threshold. In a thirteenth aspect, alone or in combination with the twelfth aspect, the SMTC indicates at least one of a timing duration, an offset associated with measurements on one or more SSB rasters, or a periodicity associated with the measurements on the one or more SSB rasters. In a fourteenth aspect, alone or in combination with one or more of the twelfth through thirteenth aspects, process 700 includes using the RSRP threshold instead of a configured RSRP threshold.

In a fifteenth aspect, alone or in combination with one or more of the first through fourteenth aspects, communicating with the UE on the side channel comprises creating a BPL with the UE. In a sixteenth aspect, alone or in combination with one or more of the first through fifteenth aspects, process 700 includes receiving, from the UE, a beam training trigger signal associated with a beam training operation, wherein creating the BPL comprises performing the beam training operation based at least in part on receiving the beam training trigger signal. In a seventeenth aspect, alone or in combination with one or more of the first through sixteenth aspects, the beam training trigger signal comprises at least one of a start time indication associated with the beam training operation or a stop time indication associated with the beam training operation. In an eighteenth aspect, alone or in combination with one or more of the sixteenth through seventeenth aspects, the beam training trigger signal comprises a feedback configuration indication corresponding to a configuration for providing beam training feedback to the UE.

In a nineteenth aspect, alone or in combination with one or more of the sixteenth through eighteenth aspects, the beam training trigger signal comprises an indication of a number of UE beams that the UE will sweep corresponding to each repeater beam. In a twentieth aspect, alone or in combination with one or more of the seventeenth through nineteenth aspects, performing the beam training operation comprises receiving, on one or more repeater beams and via an access link band, at least one UE reference signal, and transmitting beam training feedback to the UE based at least in part on the at least one UE reference signal. In a twenty-first aspect, alone or in combination with the twentieth aspect, transmitting the beam training feedback comprises transmitting beam training feedback associated with a UE beam having a highest RSRP value.

In a twenty-second aspect, alone or in combination with the twenty-first aspect, transmitting the beam training feedback comprises transmitting the beam training feedback based at least in part on the highest RSRP value satisfying a training threshold. In a twenty-third aspect, alone or in combination with one or more of the twentieth through twenty-second aspects, receiving the at least one UE reference signal comprises receiving a plurality of reference signals, and transmitting the beam training feedback comprises transmitting the beam training feedback until a BPL beam is established that satisfies a minimum quality metric.

In a twenty-fourth aspect, alone or in combination with one or more of the first through twenty-third aspects, transmitting the alternate access path indication comprises broadcasting cell information on the side channel. In a twenty-fifth aspect, alone or in combination with the twenty-fourth aspect, the cell information comprises at least one of an SSB index or a cell ID associated with a synchronization signal detected by the repeater. In a twenty-sixth aspect, alone or in combination with the twenty-fifth aspect, the cell information comprises at least one RSRP indication associated with the at least one of the SSB index or the cell ID. In a twenty-seventh aspect, alone or in combination with the twenty-sixth aspect, the RSRP indication is not an RSRP value.

In a twenty-eighth aspect, alone or in combination with one or more of the twenty-sixth or twenty-seventh aspects, the RSRP indication indicates an RSRP classification corresponding to a specified range of RSRP values. In a twenty-ninth aspect, alone or in combination with one or more of the twenty-fourth through twenty-eighth aspects, broadcasting the cell information comprises broadcasting the cell information based at least in part on establishing a beam pair link with at least one of the UE or an additional UE. In a thirtieth aspect, alone or in combination with one or more of the twenty-fourth through twenty-ninth aspects, broadcasting the cell information comprises broadcasting the cell information based at least in part on detecting at least one synchronization signal associated with a cell.

In a thirty-first aspect, alone or in combination with one or more of the first through thirtieth aspects, process 700 includes receiving a front haul link indication from the UE, wherein the front haul link indication indicates that the repeater is to use a front haul link associated with an indicated SSB index, and monitoring for synchronization signals based at least in part on receiving the front haul link indication. In a thirty-second aspect, alone or in combination with the thirty-first aspect, the front haul link corresponds to a specified time. In a thirty-third aspect, alone or in combination with one or more of the thirty-first through thirty-second aspects, the front haul link indication indicates at least one additional SSB index to be scanned. In a thirty-fourth aspect, alone or in combination with one or more of the thirty-first through thirty-third aspects, process 700 includes transmitting an RSRP indication associated with the SSB index, wherein the front haul link indication indicates a gain setting associated with the SSB index and based at least in part on the RSRP indication.

In a thirty-fifth aspect, alone or in combination with one or more of the first through thirty-fourth aspects, process 700 includes receiving, from the UE, cell reselection information. In a thirty-sixth aspect, alone or in combination with the thirty-fifth aspect, receiving the cell reselection information comprises receiving the cell reselection information on the side channel. In a thirty-seventh aspect, alone or in combination with one or more of the thirty-fifth or thirty-sixth aspects, the cell reselection information includes at least one of a physical cell identifier associated with a cell to be tracked, time domain information associated with tracking the cell, domain information associated with tracking the cell, an SSB based measurement timing configuration, or processing information associated with tracking the cell. In a thirty-eighth aspect, alone or in combination with the thirty-seventh aspect, the processing information includes at least one of an RSRP criterion, an SSB averaging indication, or a cell reselection priority indication.

In a thirty-ninth aspect, alone or in combination with one or more of the thirty-fifth through thirty-eighth aspects, process 700 includes transmitting, based at least in part on receiving the cell reselection information, a cell reselection tracking response that indicates at least one of an indication that the repeater can perform cell tracking associated with a set of indicated cells, an indication that the repeater can perform cell tracking associated with a subset of the set of indicated cells, or a tracking feature that is not available at the repeater. In a fortieth aspect, alone or in combination with the thirty-ninth aspect, the tracking feature comprises at least one of a synchronization signal block averaging feature, a cell ranking feature, or a beam ranking feature.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
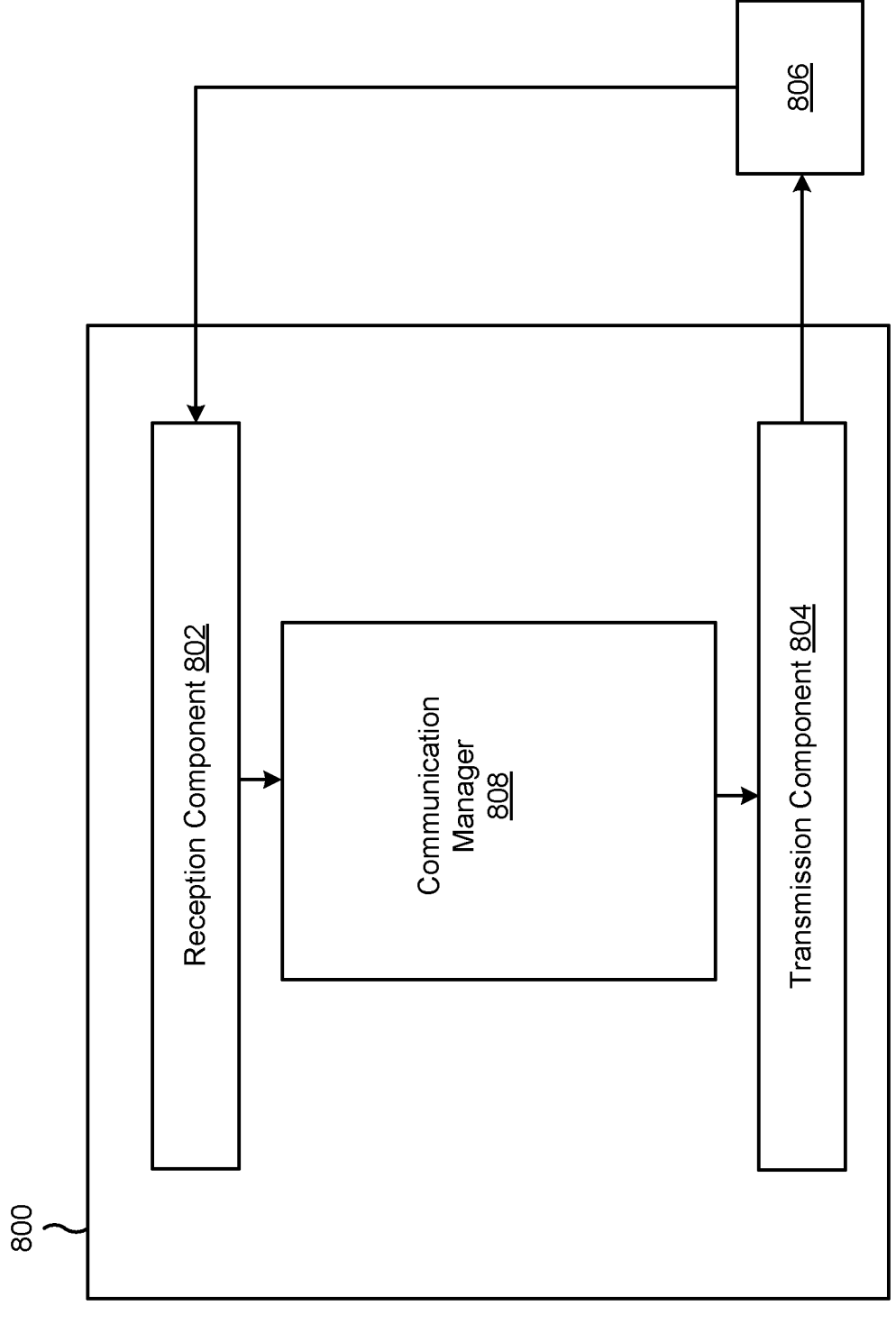
FIGS. 8-10 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, repeater, or another wireless communication device) using the reception component 802 and the transmission component 804. As further shown, the apparatus 800 may include a communication manager 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a repeater, an alternate access path indication associated with an access link connection path for connecting to a network node. The communication manager 808, the reception component 802 and/or the transmission component 804 may communicate with the repeater on a side channel to establish a connection to the network node via the access link connection path. In some aspects, the communication manager 808 may include one or more antennas, a modem, a controller/processor, a memory, or a combination thereof, of the UE described in connection with FIG. 2. In some aspects, the communication manager 808 may be, be similar to, include, or be included in the communication manager 150 depicted in FIGS. 1 and 2. In some aspects, the communication manager 808 may include the reception component 802 and/or the transmission component 804.

The transmission component 804 may transmit a cell tracking indication to the repeater. The transmission component 804 may transmit, to the network node, a beam training resource request for resources associated with a beam training operation associated with creating the BPL. The reception component 802 may receive a beam training resource grant that indicates a set of beam training resources for the beam training operation. The transmission component 804 may transmit, to the repeater, a beam training trigger signal associated with a beam training operation, wherein creating the BPL comprises performing the beam training operation based at least in part on receiving the beam training trigger signal. The transmission component 804 may transmit, to the network node, an alternate path discovery control message comprising an indication of an alternate path discovery request and an indication of the subset of SSB indices.

The reception component 802 may receive, from the network node, an alternate path discovery reply comprising at least one of a resource grant for UE reference signals to be used for alternate path measurements, or an indication of a downlink measurement reporting occasion. The transmission component 804 may transmit a front haul link indication to the repeater, wherein the front haul link indication indicates that the repeater is to use a front haul link associated with an indicated SSB index. The reception component 802 may receive an RSRP indication associated with the indicated SSB index, wherein the front haul link indication indicates a gain setting associated with the indicated SSB index and based at least in part on the RSRP indication. The transmission component 804 may transmit cell reselection information to the repeater. The reception component 802 may receive, based at least in part on receiving the cell reselection information, a cell reselection tracking response that indicates at least one of an indication that the repeater can perform cell tracking associated with a set of indicated cells, an indication that the repeater can perform cell tracking associated with a subset of the set of indicated cells, or a tracking feature that is not available at the repeater.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
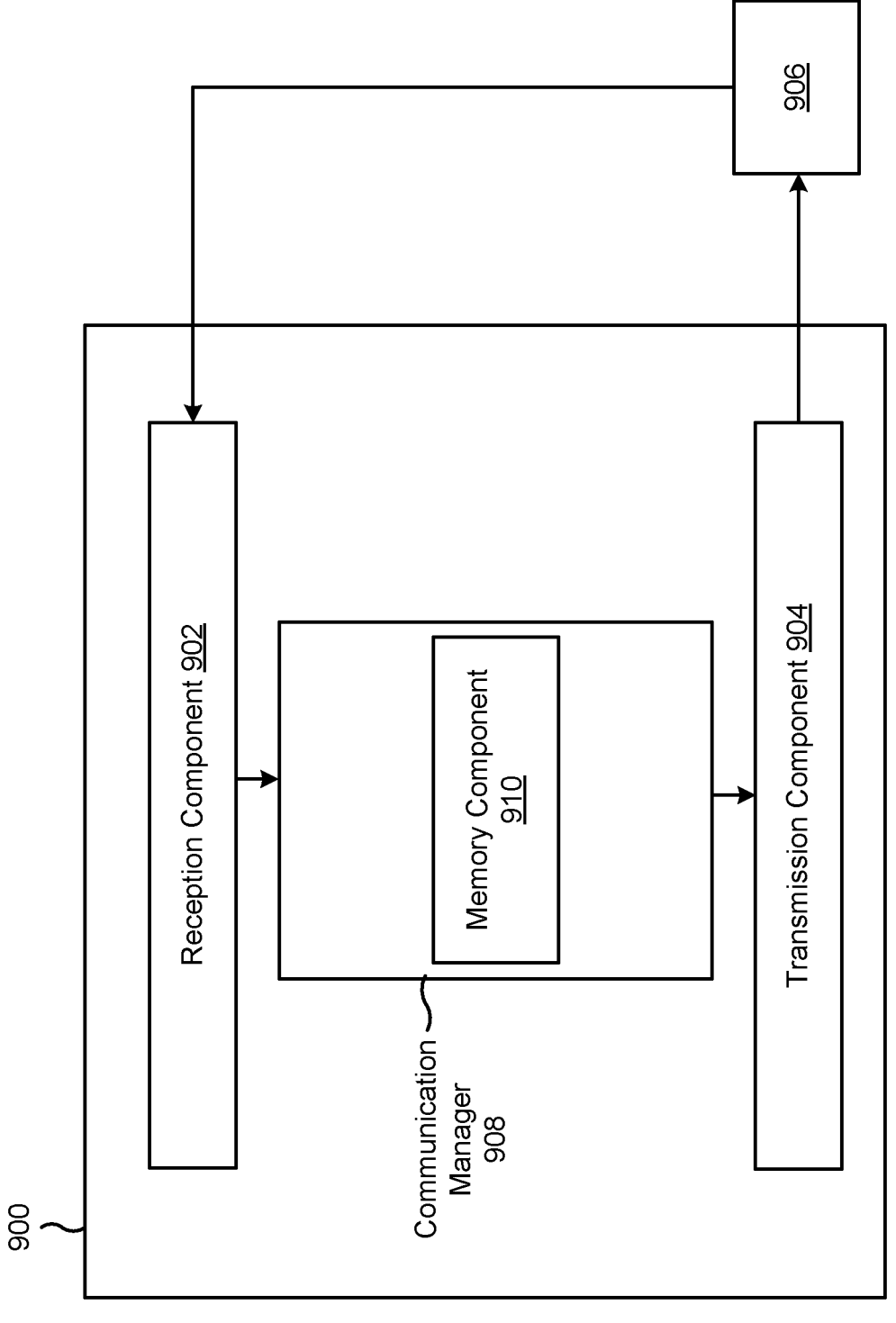

FIG. 9 is a diagram of an example apparatus 900 for wireless communication. The apparatus 900 may be a repeater, or a repeater may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include a communication manager 908. The communication manager 908 may include a memory component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the repeater described in connection with FIG. 3. Additionally, or alternatively, one or more components shown in FIG. 9 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the repeater described in connection with FIG. 3.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the repeater described in connection with FIG. 3. In some aspects, the transmission component 904 may be co-located with the reception component 902 in a transceiver.

The transmission component 904 may transmit, to a UE, an alternate access path indication associated with an access link connection path for connecting to a network node. The communication manager 908, reception component 902, and/or transmission component 904 may communicate with the UE on a side channel to establish a connection to the network node via the access link connection path. In some aspects, the communication manager 908 may include one or more antennas, a modem, a controller/processor, a memory, or a combination thereof, of the repeater described in connection with FIG. 3. In some aspects, the communication manager 908 may be, be similar to, include, or be included in the communication manager 314 depicted in FIG. 3, and/or the communication manager 170 depicted in FIG. 1. In some aspects, the communication manager 908 may include reception component 902 and/or 904.

The communication manager 908 and/or reception component 902 may monitor for synchronization signals. The reception component 902 may receive a synchronization signal from the network node. The communication manager 908 and/or the memory component 910 may store an SSB index associated with the synchronization signal. The communication manager 908 and/or the memory component 910 may store, in association with the SSB index, at least one of the RSRP value, a sub-carrier spacing corresponding to the synchronization signal, a system frame number corresponding to the synchronization signal, an SSB subcarrier offset associated with the network node, cell barred information associated with the network node, or an indication allowing intra-frequency re-selection associated with the network node. The communication manager 908 and/or the memory component 910 may store a mapping between the SSB index and a beam index corresponding to a repeater beam on which the synchronization signal was received. The reception component 902 may receive a cell tracking indication from the UE, wherein monitoring for synchronization signals comprises monitoring for synchronization signals based at least in part on receiving the cell tracking indication. The communication manager 908 may use the RSRP threshold instead of a configured RSRP threshold.

The reception component 902 may receive, from the UE, a beam training trigger signal associated with a beam training operation, wherein creating the BPL comprises performing the beam training operation based at least in part on receiving the beam training trigger signal. The reception component 902 may receive a front haul link indication from the UE, wherein the front haul link indication indicates that the repeater is to use a front haul link associated with an indicated SSB index. The communication manager 908 and/or the memory component 910 may monitor for synchronization signals based at least in part on receiving the front haul link indication.

The transmission component 904 may transmit an RSRP indication associated with the SSB index, wherein the front haul link indication indicates a gain setting associated with the SSB index and based at least in part on the RSRP indication. The reception component 902 may receive, from the UE, cell reselection information.

The transmission component 904 may transmit, based at least in part on receiving the cell reselection information, a cell reselection tracking response that indicates at least one of an indication that the repeater can perform cell tracking associated with a set of indicated cells, an indication that the repeater can perform cell tracking associated with a subset of the set of indicated cells, or a tracking feature that is not available at the repeater.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
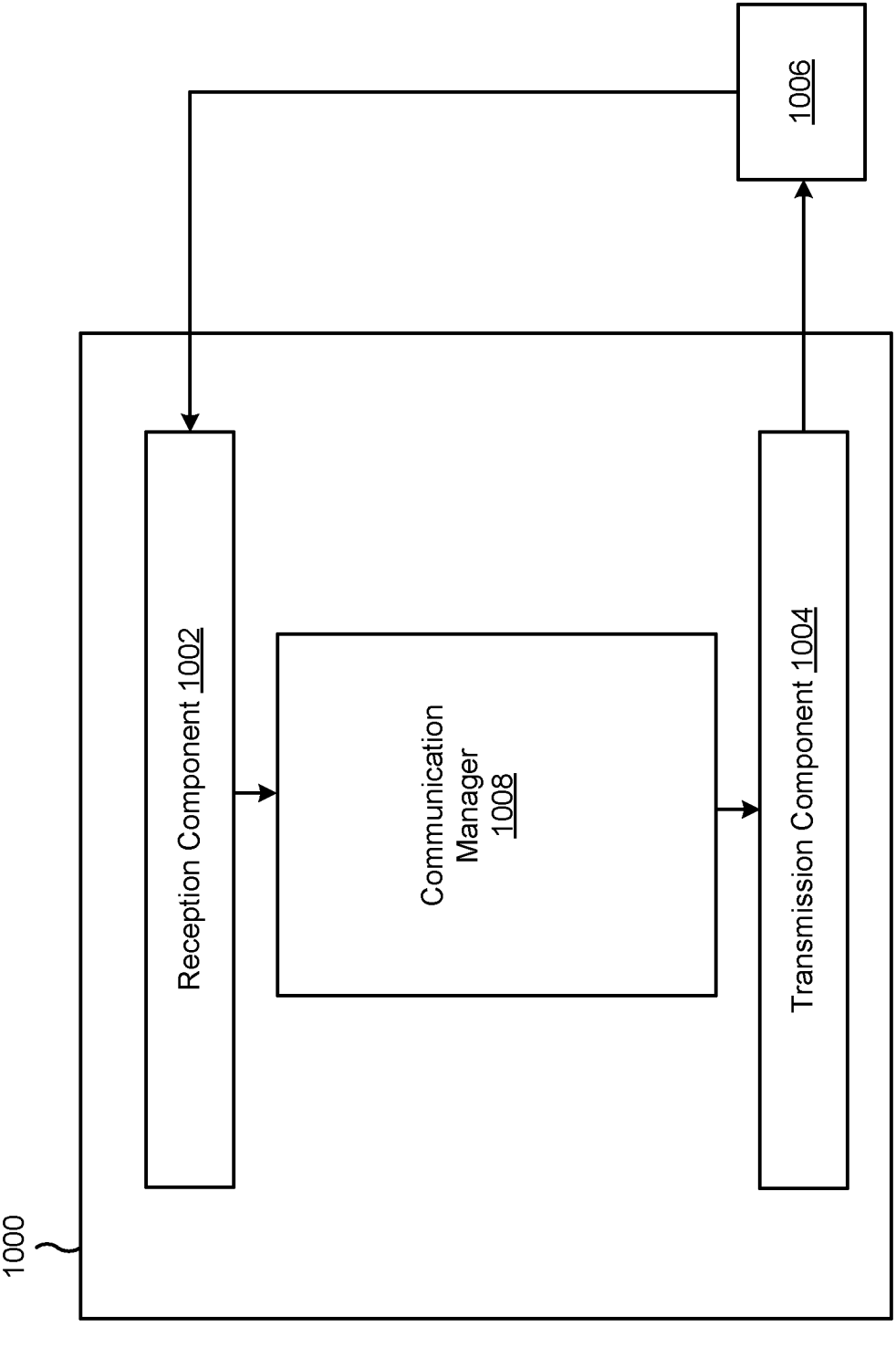

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 5. Additionally, or alternatively, the apparatus 1000 may be configured to perform one or more processes described herein. In some aspects, the apparatus 1000 and/or one or more components shown in FIG. 10 may include one or more components of the UE or the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE or the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/ processor, a memory, or a combination thereof, of the UE or the base station described in connection with FIG. 2. In some aspects, the transmission component 1004 may be co-located with the reception component 1002 in a transceiver.

The reception component 1002 may receive, from a UE, a beam training resource request for resources associated with a beam training operation associated with creating a BPL. The transmission component 1004 may transmit, to the UE, a beam training resource grant that indicates a set of beam training resources for the beam training operation. The reception component 1002 may receiver, from a UE, an alternate path discovery control message comprising an indication of an alternate path discovery request and an indication of the subset of SSB indices.

The communication manager 1008 may determine whether to accept the alternate path discovery request. In some aspects, the communication manager 1008 may include one or more antennas, a modem, a controller/ processor, a memory, or a combination thereof, of the UE or base station described in connection with FIG. 2. In some aspects, the communication manager 1008 may be, be similar to, include, or be included in the communication manager 170 depicted in FIGS. 1 and 2. In some aspects, the communication manager 1008 may include the reception component 1002 and/or the transmission component 1004. The transmission component 1004 may transmit, to the UE, an alternate path discovery reply comprising at least one of a resource grant for UE reference signals to be used for alternate path measurements or an indication of a downlink measurement reporting occasion. In some aspects, the communication manager 1008, the reception component 1002, and/or the transmission component 1004 may communicate with a repeater, as described herein.

The following provides an overview of some Aspects of the present disclosure:

Aspect 1: A method of wireless communication performed by a user equipment (UE), comprising: receiving, from a repeater, an alternate access path indication associated with an access link connection path for connecting to a network node; and communicating with the repeater on a side channel to establish a connection to the network node via the access link connection path.

Aspect 2: The method of Aspect 1, further comprising transmitting a cell tracking indication to the repeater.

Aspect 3: The method of Aspect 2, wherein transmitting the cell tracking indication comprises transmitting the cell tracking indication on the side channel.

Aspect 4: The method of either of Aspects 2 or 3, wherein the cell tracking indication comprises only one bit.

Aspect 5: The method of any of Aspects 2-4, wherein the cell tracking indication indicates at least one of: at least one cell identifier (ID), a band to be monitored, a bandwidth part to be monitored, a synchronization raster, a channel raster, an SSB based measurement timing configuration (SMTC), or an indication of a reference signal received power (RSRP) threshold.

Aspect 6: The method of Aspect 5, wherein the SMTC indicates at least one of: a timing duration, an offset associated with measurements on one or more SSB rasters, or a periodicity associated with the measurements on the one or more SSB rasters.

Aspect 7: The method of any of Aspects 1-6, wherein communicating with the repeater on the side channel comprises creating a beam pair link (BPL) with the repeater.

Aspect 8: The method of Aspect 7, further comprising transmitting, to the network node, a beam training resource request for resources associated with a beam training operation associated with creating the BPL.

Aspect 9: The method of Aspect 8, wherein transmitting the beam training resource request comprises transmitting a radio resource control message that indicates the beam training resource request.

Aspect 10: The method of either of Aspects 8 or 9, wherein transmitting the beam training resource request comprises transmitting a medium access control control element that indicates the beam training resource request.

Aspect 11: The method of any of Aspects 8-10, further comprising receiving a beam training resource grant that indicates a set of beam training resources for the beam training operation.

Aspect 12: The method of Aspect 11, wherein receiving the beam training resource grant comprises receiving a downlink control information transmission that indicates the beam training resource grant.

Aspect 13: The method of either of Aspects 11 or 12, wherein the beam training resource grant indicates at least one of: a time domain resource for beam training, a frequency domain resource for beam training, a periodicity associated with a repetition of the set of beam training resources, a maximum number of measurement periods associated with the repetition of the set of beam training resources, a set of reference signals to be used for the beam training operation, a feedback resource for receiving feedback from the repeater, or a maximum power for transmission of a reference signal of the set of reference signals.

Aspect 14: The method of Aspect 13, wherein the feedback resource corresponds to a beam training occasion.

Aspect 15: The method of any of Aspects 7-14, further comprising transmitting, to the repeater, a beam training trigger signal associated with a beam training operation, wherein creating the BPL comprises performing the beam training operation based at least in part on receiving the beam training trigger signal.

Aspect 16: The method of Aspect 15, wherein the beam training trigger signal comprises at least one of a start time indication associated with the beam training operation or a stop time indication associated with the beam training operation.

Aspect 17: The method of either of Aspects 15 or 16, wherein the beam training trigger signal comprises a feedback configuration indication corresponding to a configuration for providing beam training feedback to the UE.

Aspect 18: The method of any of Aspects 15-17, wherein the beam training trigger signal comprises an indication of a number of UE beams that the UE will sweep corresponding to each repeater beam.

Aspect 19: The method of any of Aspects 15-18, wherein performing the beam training operation comprises: transmitting, via an access link band, at least one UE reference signal; and receiving beam training feedback from the repeater based at least in part on the at least one UE reference signal.

Aspect 20: The method of Aspect 19, wherein receiving the beam training feedback comprises receiving beam training feedback associated with a UE beam having a highest reference signal received power (RSRP) value.

Aspect 21: The method of Aspect 20, wherein receiving the beam training feedback comprises receiving the beam training feedback based at least in part on the highest RSRP value satisfying a training threshold.

Aspect 22: The method of any of Aspects 19-21, wherein transmitting the at least one UE reference signal comprises transmitting a plurality of reference signals, and wherein receiving the beam training feedback comprises receiving the beam training feedback until a BPL beam is established that satisfies a minimum quality metric.

Aspect 23: The method of any of Aspects 1-22, wherein receiving the alternate access path indication comprises receiving a broadcast indicating cell information on the side channel.

Aspect 24: The method of Aspect 23, wherein the cell information comprises at least one of a synchronization signal block (SSB) index or a cell identifier (ID) associated with a synchronization signal detected by the repeater.

Aspect 25: The method of Aspect 24, wherein the cell information comprises at least one reference signal received power (RSRP) indication associated with the at least one of the SSB index or the cell ID.

Aspect 26: The method of Aspect 25, wherein the RSRP indication is not an RSRP value.

Aspect 27: The method of either of Aspects 25 or 26, wherein the RSRP indication indicates an RSRP classification corresponding to a specified range of RSRP values.

Aspect 28: The method of any of Aspects 24-27, wherein the at least one of the SSB index or the cell ID comprises a set of SSB indices, the method further comprising selecting a subset of indices of the set of indices.

Aspect 29: The method of Aspect 28, wherein the cell information comprises at least one reference signal received power (RSRP) indication associated with the at least one of the SSB index or the cell ID, and wherein selecting the subset of indices comprises selecting the subset of indices based at least in part on the at least one RSRP indication.

Aspect 30: The method of either of Aspects 28 or 29, wherein selecting the subset of indices comprises selecting the subset of indices based at least in part on at least one of a link quality of a direct link between the UE and the network node or a link quality of a beam pair link between the UE and the repeater.

Aspect 31: The method of any of Aspects 28-30, further comprising transmitting, to the network node, an alternate path discovery control message comprising an indication of an alternate path discovery request and an indication of the subset of SSB indices.

Aspect 32: The method of Aspect 31, further comprising receiving, from the network node, an alternate path discovery reply comprising at least one of: a resource grant for UE reference signals to be used for alternate path measurements, or an indication of a downlink measurement reporting occasion.

Aspect 33: The method of any of Aspects 1-32, further comprising transmitting a front haul link indication to the repeater, wherein the front haul link indication indicates that the repeater is to use a front haul link associated with an indicated synchronization signal block (SSB) index.

Aspect 34: The method of Aspect 33, wherein the front haul link corresponds to a specified time.

Aspect 35: The method of either of Aspects 33 or 34, wherein the front haul link indication indicates at least one additional SSB index to be scanned.

Aspect 36: The method of any of Aspects 33-35, further comprising receiving a reference signal received power (RSRP) indication associated with the indicated SSB index, wherein the front haul link indication indicates a gain setting associated with the indicated SSB index and based at least in part on the RSRP indication.

Aspect 37: The method of any of Aspects 1-36, further comprising transmitting cell reselection information to the repeater.

Aspect 38: The method of Aspect 37, wherein transmitting the cell reselection information comprises transmitting the cell reselection information on the side channel.

Aspect 39: The method of either of Aspects 37 or 38, wherein the cell reselection information includes at least one of: a physical cell identifier associated with a cell to be tracked, time domain information associated with tracking the cell, frequency domain information associated with tracking the cell, a synchronization signal block (SSB) based measurement timing configuration, or processing information associated with tracking the cell.

Aspect 40: The method of Aspect 39, wherein the processing information includes at least one of: a reference signal received power (RSRP) criterion, an SSB averaging indication, or a cell reselection priority indication.

Aspect 41: The method of any of Aspects 37-40, further comprising receiving, based at least in part on receiving the cell reselection information, a cell reselection tracking response that indicates at least one of: an indication that the repeater can perform cell tracking associated with a set of indicated cells, an indication that the repeater can perform cell tracking associated with a subset of the set of indicated cells, or a tracking feature that is not available at the repeater.

Aspect 42: The method of Aspect 41, wherein the tracking feature comprises at least one of: a synchronization signal block averaging feature, a cell ranking feature, or a beam ranking feature.

Aspect 43: A method of wireless communication performed by a repeater, comprising: transmitting, to a user equipment (UE), an alternate access path indication associated with an access link connection path for connecting to a network node; and communicating with the UE on a side channel to establish a connection to the network node via the access link connection path.

Aspect 44: The method of Aspect 43, wherein the repeater is configured to autonomously track cell transmissions.

Aspect 45: The method of either of Aspects 43 or 44, further comprising: monitoring for synchronization signals; and receiving a synchronization signal from the network node.

Aspect 46: The method of Aspect 45, further comprising storing a synchronization signal block (SSB) index associated with the synchronization signal.

Aspect 47: The method of Aspect 46, wherein storing the SSB index comprises storing the SSB index based at least in part on a reference signal received power (RSRP) value associated with the synchronization signal satisfying an RSRP threshold.

Aspect 48: The method of Aspect 47, further comprising storing, in association with the SSB index, at least one of: the RSRP value, a sub-carrier spacing corresponding to the synchronization signal, a system frame number corresponding to the synchronization signal, an SSB subcarrier offset associated with the network node, cell barred information associated with the network node, or an indication allowing intra-frequency receiving-selection associated with the network node.

Aspect 49: The method of any of Aspects 46-48, further comprising storing a mapping between the SSB index and a beam index corresponding to a repeater beam on which the synchronization signal was received.

Aspect 50: The method of any of Aspects 45-49, wherein monitoring for synchronization signals comprises monitoring according to a periodical monitoring configuration.

Aspect 51: The method of any of Aspects 45-50, wherein monitoring for synchronization signals comprises monitoring continually.

Aspect 52: The method of any of Aspects 45-51, further comprising receiving a cell tracking indication from the UE, wherein monitoring for synchronization signals comprises monitoring for synchronization signals based at least in part on receiving the cell tracking indication.

Aspect 53: The method of Aspect 52, wherein receiving the cell tracking indication comprises receiving the cell tracking indication on the side channel.

Aspect 54: The method of either of Aspects 52 or 53, wherein the cell tracking indication comprises only one bit.

Aspect 55: The method of any of Aspects 52-54, wherein the cell tracking indication indicates at least one of: at least one cell identifier (ID), a band to be monitored, a bandwidth part to be monitored, a synchronization raster, a channel raster, an SSB based measurement timing configuration (SMTC), or an indication of a reference signal received power (RSRP) threshold.

Aspect 56: The method of Aspect 55, wherein the SMTC indicates at least one of: a timing duration, an offset associated with measurements on one or more SSB rasters, or a periodicity associated with the measurements on the one or more SSB rasters.

Aspect 57: The method of either of Aspects 55 or 56, further comprising using the RSRP threshold instead of a configured RSRP threshold.

Aspect 58: The method of any of Aspects 43-57, wherein communicating with the UE on the side channel comprises creating a beam pair link (BPL) with the UE.

Aspect 59: The method of Aspect 58, further comprising receiving, from the UE, a beam training trigger signal associated with a beam training operation, wherein creating the BPL comprises performing the beam training operation based at least in part on receiving the beam training trigger signal.

Aspect 60: The method of Aspect 59, wherein the beam training trigger signal comprises at least one of a start time indication associated with the beam training operation or a stop time indication associated with the beam training operation.

Aspect 61: The method of either of Aspects 59 or 60, wherein the beam training trigger signal comprises a feedback configuration indication corresponding to a configuration for providing beam training feedback to the UE.

Aspect 62: The method of any of Aspects 59-61, wherein the beam training trigger signal comprises an indication of a number of UE beams that the UE will sweep corresponding to each repeater beam.

Aspect 63: The method of any of Aspects 59-62, wherein performing the beam training operation comprises: receiving, on one or more repeater beams and via an access link band, at least one UE reference signal; and transmitting beam training feedback to the UE based at least in part on the at least one UE reference signal.

Aspect 64: The method of Aspect 63, wherein transmitting the beam training feedback comprises transmitting beam training feedback associated with a UE beam having a highest reference signal received power (RSRP) value.

Aspect 65: The method of Aspect 64, wherein transmitting the beam training feedback comprises transmitting the beam training feedback based at least in part on the highest RSRP value satisfying a training threshold.

Aspect 66: The method of any of Aspects 63-65, wherein receiving the at least one UE reference signal comprises receiving a plurality of reference signals, and wherein transmitting the beam training feedback comprises transmitting the beam training feedback until a BPL beam is established that satisfies a minimum quality metric.

Aspect 67: The method of any of Aspects 43-66, wherein transmitting the alternate access path indication comprises broadcasting cell information on the side channel.

Aspect 68: The method of Aspect 67, wherein the cell information comprises at least one of a synchronization signal block (SSB) index or a cell identifier (ID) associated with a synchronization signal detected by the repeater.

Aspect 69: The method of Aspect 68, wherein the cell information comprises at least one reference signal received power (RSRP) indication associated with the at least one of the SSB index or the cell ID.

Aspect 70: The method of Aspect 69, wherein the RSRP indication is not an RSRP value.

Aspect 71: The method of either of Aspects 69 or 70, wherein the RSRP indication indicates an RSRP classification corresponding to a specified range of RSRP values.

Aspect 72: The method of any of Aspects 67-71, wherein broadcasting the cell information comprises broadcasting the cell information based at least in part on establishing a beam pair link with at least one of the UE or an additional UE.

Aspect 73: The method of any of Aspects 67-72, wherein broadcasting the cell information comprises broadcasting the cell information based at least in part on detecting at least one synchronization signal associated with a cell.

Aspect 74: The method of any of Aspects 43-73, further comprising: receiving a front haul link indication from the UE, wherein the front haul link indication indicates that the repeater is to use a front haul link associated with an indicated synchronization signal block (SSB) index; and monitoring for synchronization signals based at least in part on receiving the front haul link indication.

Aspect 75: The method of Aspect 74, wherein the front haul link corresponds to a specified time.

Aspect 76: The method of either of Aspects 74 or 75, wherein the front haul link indication indicates at least one additional SSB index to be scanned.

Aspect 77: The method of any of Aspects 74-76, further comprising transmitting a reference signal received power (RSRP) indication associated with the SSB index, wherein the front haul link indication indicates a gain setting associated with the SSB index and based at least in part on the RSRP indication.

Aspect 78: The method of any of Aspects 43-77, further comprising receiving, from the UE, cell reselection information.

Aspect 79: The method of Aspect 78, wherein receiving the cell reselection information comprises receiving the cell reselection information on the side channel.

Aspect 80: The method of either of Aspects 78 or 79, wherein the cell reselection information includes at least one of: a physical cell identifier associated with a cell to be tracked, time domain information associated with tracking the cell, frequency domain information associated with tracking the cell, a synchronization signal block (SSB) based measurement timing configuration, or processing information associated with tracking the cell.

Aspect 81: The method of Aspect 80, wherein the processing information includes at least one of: a reference signal received power (RSRP) criterion, an SSB averaging indication, or a cell reselection priority indication.

Aspect 82: The method of any of Aspects 78-81, further comprising transmitting, based at least in part on receiving the cell reselection information, a cell reselection tracking response that indicates at least one of: an indication that the repeater can perform cell tracking associated with a set of indicated cells, an indication that the repeater can perform cell tracking associated with a subset of the set of indicated cells, or a tracking feature that is not available at the repeater.

Aspect 83: The method of Aspect 82, wherein the tracking feature comprises at least one of: a synchronization signal block averaging feature, a cell ranking feature, or a beam ranking feature.

Aspect 84: An apparatus for wireless communication at a device, comprising a processor; memory coupled with the processor; and instructions stored in the memory and executable by the processor to cause the apparatus to perform the method of one or more of Aspects 1-42.

Aspect 85: A device for wireless communication, comprising a memory and one or more processors coupled to the memory, the one or more processors configured to perform the method of one or more of Aspects 1-42.

Aspect 86: An apparatus for wireless communication, comprising at least one means for performing the method of one or more of Aspects 1-42.

Aspect 87: A non-transitory computer-readable medium storing code for wireless communication, the code comprising instructions executable by a processor to perform the method of one or more of Aspects 1-42.

Aspect 88: A non-transitory computer-readable medium storing a set of instructions for wireless communication, the set of instructions comprising one or more instructions that, when executed by one or more processors of a device, cause the device to perform the method of one or more of Aspects 1-42.

Aspect 89: An apparatus for wireless communication at a device, comprising a processor; memory coupled with the processor; and instructions stored in the memory and executable by the processor to cause the apparatus to perform the method of one or more of Aspects 43-83.

Aspect 90: A device for wireless communication, comprising a memory and one or more processors coupled to the memory, the one or more processors configured to perform the method of one or more of Aspects 43-83.

Aspect 91: An apparatus for wireless communication, comprising at least one means for performing the method of one or more of Aspects 43-83.

Aspect 92: A non-transitory computer-readable medium storing code for wireless communication, the code comprising instructions executable by a processor to perform the method of one or more of Aspects 43-83.

Aspect 93: A non-transitory computer-readable medium storing a set of instructions for wireless communication, the set of instructions comprising one or more instructions that, when executed by one or more processors of a device, cause the device to perform the method of one or more of Aspects 43-83.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

transmit a cell tracking indication to a repeater;

receive, from the repeater, an alternate access path indication associated with an access link connection path for connecting to a network node, wherein the alternate access path is based at least in part on the cell tracking indication; and communicate with the repeater, based at least in part on a beam pair link (BPL) between one or more beams of the UE and one or more beams of the repeater, on a side channel to establish a connection to the network node via the access link connection path.

2. The UE of claim 1,
wherein the cell tracking indication indicates for the repeater to perform cell tracking.

3. The UE of claim 2,
wherein the one or more processors, to transmit the cell tracking indication, are configured to transmit the cell tracking indication on the side channel.

4. The UE of claim 1,
wherein the one or more processors, to communicate with the repeater on the side channel, are configured to create the BPL with the repeater.

5. The UE of claim 4,
wherein the one or more processors are further configured to transmit, to the network node, a beam training resource request for resources associated with a beam training operation associated with creating the BPL.

6. The UE of claim 5,
wherein the one or more processors are further configured to receive a beam training resource grant that indicates a set of beam training resources for the beam training operation.

7. The UE of claim 4,
wherein the one or more processors are further configured to transmit, to the repeater, a beam training trigger signal associated with a beam training operation, wherein the one or more processors, to create the BPL, are configured to perform the beam training operation based at least in part on receiving the beam training trigger signal.

8. The UE of claim 7,
wherein the beam training trigger signal comprises at least one of a start time indication associated with the beam training operation, a stop time indication associated with the beam training operation, a feedback configuration indication corresponding to a configuration for providing beam training feedback to the UE, or an indication of a number of UE beams that the UE will sweep corresponding to each repeater beam.

9. The UE of claim 7,
wherein the one or more processors, to perform the beam training operation, are configured to:

transmit, via an access link band, at least one UE reference signal; and receive beam training feedback from the repeater based at least in part on the at least one UE reference signal.

10. The UE of claim 9,
wherein the one or more processors, to receive the beam training feedback, are configured to receive beam training feedback associated with a UE beam having a highest reference signal received power (RSRP) value.

11. The UE of claim 10,
wherein the one or more processors, to receive the beam training feedback, are configured to receive the beam training feedback based at least in part on the highest RSRP value satisfying a training threshold.

12. The UE of claim 1,
wherein the one or more processors, to receive the alternate access path indication, are configured to receive a broadcast indicating cell information on the side channel.

13. The UE of claim 12,
wherein the cell information comprises at least one of a synchronization signal block (SSB) index or a cell identifier (ID) associated with a synchronization signal detected by the repeater.

14. The UE of claim 13,
wherein the cell information comprises at least one reference signal received power (RSRP) indication associated with the at least one of the SSB index or the cell ID.

15. The UE of claim 14,
wherein the RSRP indication is not an RSRP value.

16. The UE of claim 14,
wherein the RSRP indication indicates an RSRP classification corresponding to a specified range of RSRP values.

17. The UE of claim 13,
wherein the at least one of the SSB index or the cell ID comprises a set of SSB indices, and wherein the one or more processors are further configured to select a subset of indices of the set of indices.

18. The UE of claim 17,
wherein the cell information comprises at least one reference signal received power (RSRP) indication associated with the at least one of the SSB index or the cell ID, and wherein the one or more processors, to select the subset of indices, are configured to select the subset of indices based at least in part on the at least one RSRP indication.

19. The UE of claim 17,
wherein the one or more processors, to select the subset of indices, are configured to select the subset of indices based at least in part on at least one of a link quality of a direct link between the UE and the network node or a link quality of a beam pair link between the UE and the repeater.

20. The UE of claim 17,
wherein the one or more processors are further configured to transmit, to the network node, an alternate path discovery control message comprising an indication of an alternate path discovery request and an indication of the subset of SSB indices.

21. The UE of claim 20,
wherein the one or more processors are further configured to receive, from the network node, an alternate path discovery reply comprising at least one of:

a resource grant for UE reference signals to be used for alternate path measurements, or an indication of a downlink measurement reporting occasion.

22. The UE of claim 1,
wherein the one or more processors are further configured to transmit a front haul link indication to the repeater, wherein the front haul link indication indicates that the repeater is to use a front haul link associated with an indicated synchronization signal block (SSB) index.

23. The UE of claim 1,
wherein the one or more processors are further configured to transmit cell reselection information to the repeater.

24. The UE of claim 23,
wherein the one or more processors are further configured to receive, based at least in part on receiving the cell reselection information, a cell reselection tracking response that indicates at least one of:

an indication that the repeater can perform cell tracking associated with a set of indicated cells, an indication that the repeater can perform cell tracking associated with a subset of the set of indicated cells, or a tracking feature that is not available at the repeater.

25. A repeater for wireless communication, comprising:

one or more memories; and one or more processors, coupled to the one or more memories, configured to:

receive a cell tracking indication from a user equipment (UE);

transmit, to the UE, an alternate access path indication associated with an access link connection path for connecting to a network node, wherein the alternate access path is based at least in part on the cell tracking indication; and communicate with the UE, based at least in part on a beam pair link (BPL) between one or more beams of the UE and one or more beams of the repeater, on a side channel to establish a connection to the network node via the access link connection path.

26. The repeater of claim 25, wherein the one or more processors are further configured to:

monitor for synchronization signals; and receive a synchronization signal from the network node.

27. A method of wireless communication performed by a user equipment (UE), comprising:

transmitting a cell tracking indication to a repeater;

receiving, from the repeater, an alternate access path indication associated with an access link connection path for connecting to a network node, wherein the alternate access path is based at least in part on the cell tracking indication; and communicating, based at least in part on a beam pair link (BPL) between one or more beams of the UE and one or more beams of the repeater, with the repeater on a side channel to establish a connection to the network node via the access link connection path.

28. The method of claim 27, wherein communicating with the repeater on the side channel comprises creating a beam pair link (BPL) with the repeater.

29. A method of wireless communication performed by a repeater, comprising:

receiving a cell tracking indication from a user equipment (UE);

transmitting, to the UE, an alternate access path indication associated with an access link connection path for connecting to a network node, wherein the alternate access path is based at least in part on the cell tracking indication; and communicating, based at least in part on a beam pair link (BPL) between one or more beams of the UE and one or more beams of the repeater, with the UE on a side channel to establish a connection to the network node via the access link connection path.

30. The method of claim 29, further comprising:

monitoring for synchronization signals; and receiving, based at least in part on the monitoring, a synchronization signal from the network node.

* * * * *